(12) United States Patent
Hagerty et al.

(10) Patent No.: US 7,691,956 B2
(45) Date of Patent: *Apr. 6, 2010

(54) POLYMERIZATION PROCESS

(75) Inventors: Robert O. Hagerty, La Porte, TX (US);
Chia S. Chee, Houston, TX (US);
Randall B. Laird, Pasadena, TX (US);
Michael A. Risch, Seabrook, TX (US);
Pradeep P. Shirodkar, Stow, OH (US);
Zerong Lin, Kingwood, TX (US); Larry L. Iaccino, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 360 days.

This patent is subject to a terminal disclaimer.

(21) Appl. No.: 11/628,876

(22) PCT Filed: Jun. 20, 2005

(86) PCT No.: PCT/US2005/021649

§ 371 (c)(1),
(2), (4) Date: Aug. 27, 2007

(87) PCT Pub. No.: WO2006/009946

PCT Pub. Date: Jan. 26, 2006

(65) Prior Publication Data

US 2008/0081885 A1 Apr. 3, 2008

Related U.S. Application Data

(60) Provisional application No. 60/581,447, filed on Jun. 21, 2004.

(51) Int. Cl.
*C08F 2/14* (2006.01)
*C08F 4/6592* (2006.01)

(52) U.S. Cl. .................. 526/206; 526/74; 526/160; 526/165; 526/912; 526/943

(58) Field of Classification Search .................. 526/160, 526/165, 943, 74, 206, 912
See application file for complete search history.

(56) References Cited

U.S. PATENT DOCUMENTS

| 2,534,698 A | 12/1950 | Calfee et al. |
| 2,825,721 A | 3/1958 | Hogan et al. |
| 2,915,513 A | 12/1959 | Leatherman et al. |
| 3,152,872 A | 10/1964 | Scoggin et al. |
| 3,293,000 A | 12/1966 | Marwil |
| 3,324,093 A | 6/1967 | Alleman |
| 3,470,143 A | 9/1969 | Schrage et al. |
| 3,625,658 A | 12/1971 | Closon |
| 3,816,383 A | 6/1974 | Stotko |
| 3,825,524 A | 7/1974 | Wada et al. |
| 3,858,943 A | 1/1975 | Bose et al. |
| 3,956,061 A | 5/1976 | Young et al. |
| 4,007,321 A | 2/1977 | Scholz et al. |
| 4,121,029 A | 10/1978 | Irvin et al. |
| 4,187,278 A | 2/1980 | Clifford |
| 4,199,546 A | 4/1980 | Kirch |
| 4,372,758 A | 2/1983 | Bobst et al. |
| 4,395,523 A | 7/1983 | Kirch |
| 4,424,341 A | 1/1984 | Hanson et al. |
| 4,461,889 A | 7/1984 | Hanson |
| 4,492,787 A | 1/1985 | Takashima et al. |
| 4,501,885 A | 2/1985 | Sherk et al. |
| 4,589,957 A | 5/1986 | Sherk et al. |
| 4,613,484 A | 9/1986 | Ayres et al. |
| 4,632,976 A | 12/1986 | Asanuma et al. |
| 4,690,804 A | 9/1987 | Rohlfing |
| 4,737,280 A | 4/1988 | Hanson |
| 4,794,151 A | 12/1988 | Mueller-Mall et al. |
| 5,183,866 A | 2/1993 | Hottovy |
| 5,207,929 A | 5/1993 | Sung et al. |
| 5,292,863 A | 3/1994 | Wang |
| 5,391,656 A | 2/1995 | Campbell et al. |
| 5,455,314 A | 10/1995 | Burns et al. |

(Continued)

FOREIGN PATENT DOCUMENTS

EP 0 881 237 12/1998

(Continued)

OTHER PUBLICATIONS

"A study of halocarbon promoter influence on catalyst reactivity and polymer Mn in vanadium-based ethylene polymerizations," Reinking, M. K. et al., Applied Catalysis A: General, Elsevier Science, Amsterdam, NL, vol. 189, No. 1, Nov. 22, 1999, 23-34, XP004272041.

(Continued)

*Primary Examiner*—Caixia Lu
(74) *Attorney, Agent, or Firm*—Frank E. Reid

(57) ABSTRACT

This invention is directed to processes of making polymer in the presence of a hydrofluorocarbon or perfluorocarbon and recovering the polymer. The processes provided enable polymerization processes to be practiced with minimal fouling in the reaction system, and to the recovery of the hydrofluorocarbon and other hydrocarbons such as hydrocarbons for reuse in the process or hydrocarbon by-products from the polymerization process. The invention is particularly beneficial in the production of ethylene based polymers using bulky ligand metallocene-type catalyst systems.

54 Claims, 1 Drawing Sheet

U.S. PATENT DOCUMENTS

| | | | |
|---|---|---|---|
| 5,556,821 A | 9/1996 | Aida et al. | |
| 5,565,175 A | 10/1996 | Hottovy et al. | |
| 5,575,979 A | 11/1996 | Hanson | |
| 5,597,892 A | 1/1997 | Hanson | |
| 5,624,878 A | 4/1997 | Devore et al. | |
| 6,204,344 B1 | 3/2001 | Kendrick et al. | |
| 6,239,235 B1 | 5/2001 | Hottovy et al. | |
| 7,423,103 B2 * | 9/2008 | Stavens et al. | 526/206 |
| 2003/0027952 A1 | 2/2003 | Farrer et al. | |

FOREIGN PATENT DOCUMENTS

| | | |
|---|---|---|
| EP | 1 323 746 | 7/2003 |
| GB | 860 454 | 2/1961 |
| GB | 1 309 467 | 3/1973 |
| JP | 2001-139620 | 5/2001 |
| WO | WO2005/113610 | 12/2005 |
| WO | WO2005/113615 | 12/2005 |
| WO | WO2006/002132 | 1/2006 |
| WO | WO2006/009942 | 1/2006 |
| WO | WO2006/009944 | 1/2006 |
| WO | WO2006/009945 | 1/2006 |
| WO | WO2006/009946 | 1/2006 |
| WO | WO2006/009949 | 1/2006 |
| WO | WO2006/009951 | 1/2006 |
| WO | WO2006/009976 | 1/2006 |
| WO | WO2006/009977 | 1/2006 |
| WO | WO2006/009979 | 1/2006 |
| WO | WO2006/009980 | 1/2006 |
| WO | WO2006/009981 | 1/2006 |
| WO | WO2006/019494 | 2/2006 |
| WO | WO2006/025917 | 3/2006 |
| WO | WO2006/028549 | 3/2006 |
| WO | WO2006/083303 | 8/2006 |

OTHER PUBLICATIONS

Database Caplus [Online] Chemical Abstracts Service, Columbus, Ohio, US; Yoshiko Tamura et al.: "Polymerization catalysts and manufacture of high-molecular-weight ethylene polymers," XP002313005 retrieved from STN Database accession No. 2001:369728.

* cited by examiner

Density vs. Comonomer Input

Fouling vs. Density

POLYMERIZATION PROCESS

CROSS REFERENCE TO RELATED APPLICATIONS

This application is the national phase entry into the United States Patent Office of international application number PCT/US2005/021649 filed Jun. 20, 2005, which claims benefit of and priority to U.S. Provisional Patent Application Ser. No. 60/581,447 filed Jun. 21, 2004.

FIELD OF THE INVENTION

This invention relates to a slurry polymerization process for making a polymer product. In particular, this invention relates to a slurry polymerization process to produce ethylene based polymers using a metallocene catalyst system and a fluorinated hydrocarbon as at least a portion of the diluent.

BACKGROUND OF THE INVENTION

Polymerization generally involves polymerization of one or more monomers to make a polymeric product. The polymerization reaction can be carried out using a wide variety of reactors, catalysts, and a wide variety of monomer feeds. Often, liquids, diluents or solvents are used in these polymerization reaction processes for various reasons such as to increase the efficiency of the polymerization reaction and recovery of polymer product.

In many polymerization processes for the production of polymer, a polymerization effluent is formed which is a slurry of particulate polymer solids suspended in a liquid medium, ordinarily the reaction diluent and unreacted monomers. A typical example of such a process in a loop reactor is disclosed in Hogan and Bank's U.S. Pat. No. 2,825,721, the disclosure of which is incorporated herein by reference. Variations and improvements of such a process in a loop reactor are described in U.S. Pat. Nos. 2,915,513, 3,152,872, 3,293,000, 3,324,093, 3,625,658, 3,816,383, 3,858,943, 3,956,061, 4,007,321, 4,121,029, 4,199,546, 4,372,758, 4,395,523, 4,424,341, 4,461,889, 4,501,885, 4,589,957, 4,613,484, 4,632,976, 4,690,804, 4,737,280, 4,794,151, 5,183,866, 5,207,929, 5,292,863, 5,391,656, 5,455,314, 5,565,175, 5,575,979, 5,597,892, 6,204,344, and 6,239,235, the disclosures of which are fully incorporated herein by reference.

Typical examples of such a process in a stirred tank reactor are disclosed in U.S. Pat. Nos. 3,825,524, 4,187,278, and 4,492,787, the disclosures of which are incorporated herein by reference. Variations and improvements of such a process in stirred tank slurry reactor systems are known to those skilled in the art.

In most commercial scale operations, it is desirable to separate the polymer and the liquid medium comprising an inert diluent and unreacted monomers in such a manner that the liquid medium is not exposed to contamination so that the liquid medium can be recycled to the polymerization zone with minimal if any purification. The liquid medium used in slurry polymerization processes is typically a saturated hydrocarbon such as isobutane or hexane. Although such diluents are not reactive in the polymerization process, the operating window (i.e., temperature and pressure) under which the polymerization process may be operated is limited by fouling in the reactor caused by agglomeration of the polymer solids in the slurry or deposition of polymer on the wall of the reactor making it impossible to recover the polymer product.

Within the conventional operating window, a particularly favored technique that has been used heretofore is that disclosed in the Scoggin et al, U.S. Pat. No. 3,152,872, more particularly the embodiment illustrated in conjunction with FIG. 2 of that patent. In such processes the reaction diluent, dissolved monomers, and catalyst are circulated in a loop reactor wherein the pressure of the polymerization reaction is about 100 to 700 psia (689 to 4826 kPa). The produced solid polymer is also circulated in the reactor. A slurry of polymer and the liquid medium is collected in one or more settling legs of the slurry loop reactor from which the slurry is periodically discharged to a flash chamber wherein the mixture is flashed to a low pressure such as about 20 psia (138 kPa). Other preferred methods for recovery of polymer product and recirculation of diluent back in to the polymerization process are shown in U.S. Pat. No. 6,204,344 to Kendrick et al. and U.S. Pat. No. 6,239,235 to Hottovy et al. The continuous withdrawal of slurry from the reactor instead of the intermittent withdrawal method permits operation of the reactors at a higher solids content which in turn leads to economically desirable higher polymer production rate for the same reactor volume. These methods also reduce the cost of diluent recovery and recirculation by utilizing a two-stage flash process wherein the first flash is performed at a pressure and temperature permitting the diluent to be reliquified by heat exchange without the need for compression. These systems are limited in that the maximum comonomer incorporation or minimum polymer product density is limited by fouling of the polymer product in the reactor.

An example of a polymerization process that incorporates the use of a diluent other than a saturated hydrocarbon is shown in U.S. Pat. No. 3,470,143 to Schrage et al. Specifically, the Schrage patent discloses a laboratory scale polymerization reaction that incorporates the use of a fluorinated organic carbon compound as the diluent. Schrage discloses preparation of a boiling-xylene soluble polymer in a slurry which comprises polymerizing at least one ethylenically unsaturated hydrocarbon monomer to an amorphous elastomer in a reaction zone which comprises employing as a polymerization medium a fluorinated organic carbon compound.

EP 1 323 746 shows loading of biscyclopentadienyl catalyst onto a silica support in perfluorooctane and thereafter the prepolymerization of ethylene at room temperature.

U.S. Pat. No. 5,624,878 discloses the polymerization using "constrained geometry metal complexes" of titanium and zirconium.

EP 1 323 746 shows loading of biscyclopentadienyl catalyst onto a silica support in perfluorooctane and thereafter the prepolymerization of ethylene at room temperature.

There are always needs for improved polymerization processes. In particular, it would be advantageous in slurry polymerization processes using metallocene catalysts to provide expanded operating limits in terms of pressures and temperatures and expanded product slates including lower density products than previously made in such processes and the ability to increase comonomer incorporation into a polymer chain at constant comonomer input rate. It would be further advantageous to improve such processes by providing more efficient separation of polymer product from the diluent.

SUMMARY OF THE INVENTION

The invention is directed to a process for polymerizing ethylene and optionally one or more comonomer(s) in the presence of a metallocene catalyst system and a diluent to form a slurry of polymer solids, wherein the diluent comprises a fluorinated hydrocarbon.

According to another embodiment of the invention, feed is added to a reactor wherein the feed comprises ethylene at 50 weight % or more, based on total weight of ethylene and comonomer added to the reactor, ethylene comprises 50 weight % or more of the total weight of ethylene and comonomer.

According to another embodiment of the invention, the polymer product has a melting temperature of greater than or equal to 75° C.

According to another embodiment of the invention, the polymer product has a heat of fusion greater than or equal to 10 J/g.

According to another embodiment of the invention, the polymer product has crystallinity derived from ethylene incorporation of greater than or equal to 10%.

According to another embodiment of the invention, the polymer product has a CDBI of greater than or equal to 40%. In this embodiment, a single catalyst system or multiple catalyst systems can be used.

According to another embodiment of the invention, the polymer product has a MWD in the range of from 1.5 to 4.0. In this embodiment, a single catalyst system or a mixed catalyst system can be used.

According to another embodiment of the invention, the polymer product has a SDBI of the polymer is equal to or less than 25° C. In this embodiment, a single catalyst system or a mixed catalyst system can be used.

According to another embodiment of the invention, the one or more comonomers contain olefinic unsaturation and are capable of insertion polymerization. Alternatively, the one or more comonomers are selected from linear, branched, or ring-containing olefins having up to 30 carbon atoms, and combinations thereof.

According to one embodiment of the invention, the diluent is a blend of at least one hydrocarbon and at least one fluorinated hydrocarbon to produce a density close to that of the polymer such that the polymer has substantially neutral buoyancy in the blended diluent. In this embodiment, the diluent comprises a mixture of at least one saturated hydrocarbon and at least one fluorinated hydrocarbon wherein the mixture has a density in the range of from 0.2 g/cc less than to 0.2 g/cc greater than the density of the polymer.

In any of the embodiments described herein the materials stripped or flashed off may be passed through activated carbon to remove all or part of the fluorinated hydrocarbon.

Other embodiments of the invention are defined by any two or more of the above limitations in combination.

DETAILED DESCRIPTION OF THE INVENTION

Figure 1:
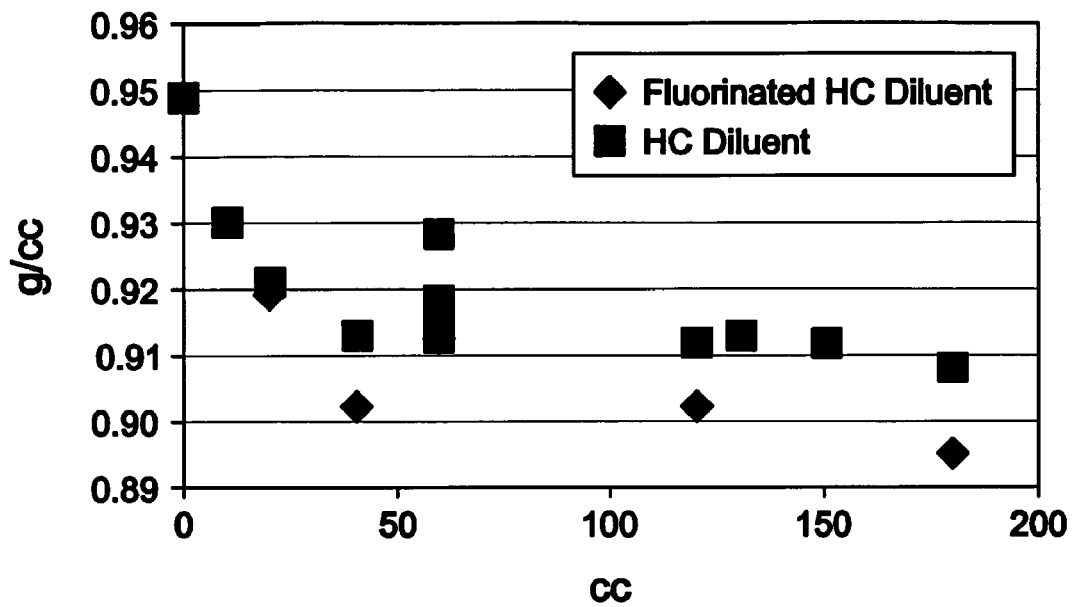
FIG. 1 shows the comonomer input to the process versus comonomer incorporation for HFC vs. hydrocarbon diluent.

The invention is directed to a process for polymerizing ethylene and optionally one or more comonomer(s) in the presence of a bulky ligand metallocene-type catalyst system or polymerization catalyst and a diluent to form a slurry of polymer solids, wherein the diluent comprises a fluorinated hydrocarbon.

The invention also relates to a polymerization process having improved operability and product capabilities. It has been surprisingly discovered that using a fluorinated hydrocarbon in a slurry polymerization process provides for a higher operating temperature and/or lower density polymer product with reduced fouling. In other words, a slurry polymerization process is provided with a larger and more flexible operating window.

While not wishing to be bound by any theory, it is believed that because the fluorinated hydrocarbon is much less soluble in the polymer being produced than typical liquids added to a slurry polymerization process, the polymers produced are less sticky. As a result, lower density polymers having a higher comonomer content, and which are typically difficult to produce at high polymerization production rates, are now possible. Furthermore, utilizing a higher boiling point liquid such as a fluorinated hydrocarbon provides for a higher ethylene partial pressure to compensate for the lower ethylene solubility in the fluorinated hydrocarbon. Therefore, fluorinated hydrocarbons having a higher boiling point are preferred.

Utilizing the fluorinated hydrocarbons in the process of the invention provides for one or more of a substantial improvement in process operability, a significant reduction in fouling better polymer particle morphology with no adverse effect on the physical polymer properties, and/or the capability to produce a broader range of polymers.

According to another embodiment of the invention, ethylene comprises 50 weight % or more of the total weight of ethylene and comonomer polymerized, alternatively 75 weight % or more, alternatively 85 weight % or more, alternatively 90 weight % or more, alternatively 95 weight % or more. Under steady state continuous polymerization (as opposed to batch operation), such as stirred slurry and loop slurry operation, the amount of ethylene in the overall feed to a reactor can be considered substantially equal to the weight percent ethylene incorporated into the polymer.

According to another embodiment of the invention, the polymer product has a melting temperature of greater than or equal to 75° C., alternatively greater than or equal to 95° C., alternatively greater than or equal to 110° C., alternatively greater than or equal to 125° C.

According to another embodiment of the invention, the polymer product has a heat of fusion greater than or equal to 10 J/g, alternatively greater than or equal to 40 J/g, alternatively greater than or equal to 70 J/g, alternatively greater than or equal to 100 J/g, alternatively greater than or equal to 130 J/g.

According to another embodiment of the invention, the polymer product has crystallinity derived from ethylene incorporation of greater than or equal to 10%, alternatively greater than or equal to 20%, alternatively greater than or equal to 30%, alternatively greater than or equal to 40%, alternatively greater than or equal to 50%.

According to another embodiment of the invention, the polymer product has a CDBI of greater than or equal to 40%, alternatively greater than or equal to 50%, alternatively greater than or equal to 60%, alternatively greater than or equal to 75%, alternatively greater than or equal to 90%. In this embodiment, a single catalyst system or multiple catalyst systems can be used.

According to another embodiment of the invention, the polymer product has a MWD in the range of from 1.5 to 4.0, alternatively from 1.8 to 3.0, alternatively from 1.9 to 2.5. In this embodiment, a single catalyst system or a mixed catalyst system can be used.

According to another embodiment of the invention, the polymer product has a SDBI of the polymer is equal to or less than 25° C., alternatively equal to or less than 20° C. In this embodiment, a single catalyst system or a mixed catalyst system can be used.

In one embodiment, the process of this invention is directed toward a slurry polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention include butadiene, norbornene, norbornadiene, isobutylene, vinylbenzocyclobutane, styrenes, alkyl substituted styrene, ethylidene norbornene, isoprene, dicyclopentadiene and cyclopentene.

In a preferred embodiment of the process of the invention, a copolymer of ethylene is produced, where with ethylene, and a comonomer having at least one alpha-olefin having from 4 to 15 carbon atoms, preferably from 4 to 12 carbon atoms, and most preferably from 4 to 8 carbon atoms, are polymerized in a slurry process.

In another embodiment of the process of the invention, ethylene and propylene is polymerized with at least one additional comonomer, optionally one of which may be a diene, to form a terpolymer.

According to one embodiment of the invention, the diluent comprises a mixture of at least one saturated hydrocarbon and at least one fluorinated hydrocarbon wherein the mixture has a density in the range of from 0.2 g/cc less than to 0.2 g/cc greater than the density of the polymer, alternatively from 0.1 g/cc less than to 0.1 g/cc greater than the density of the polymer, alternatively from 0.05 g/cc less than to 0.05 g/cc greater than the density of the polymer.

According to another embodiment of the invention, the diluent comprises a mixture of at least one saturated hydrocarbon and at least one fluorinated hydrocarbon wherein the saturated hydrocarbon comprises more than 1 weight percent of the mixture, alternatively more than 5 weight percent of the mixture, alternatively more than 10 weight percent of the mixture, alternatively more than 1 volume percent of the mixture, alternatively more than 5 volume percent of the mixture, alternatively more than 10 weight percent of the mixture.

According to another embodiment of the invention, the metallocene catalyst system comprises a Group 3-6 metal monocyclopentadienyl, biscyclopentadienyl, substituted monocyclopentadienyl or substituted biscyclopentadienyl compound. The metallocene catalyst system can be supported or unsupported, and can further comprise an activator of alumoxane or a noncoordinating anion activator.

According to another embodiment of the invention, the at least one fluorinated hydrocarbon is present in the reaction mixture in a molar ratio of at least 100:1 relative to the Group 3-6 metal, alternatively at least 500:1.

According to another embodiment of the invention, the process can be carried out in a loop reactor or a stirred tank reactor. Withdrawal of polymer product from the reactor can be accomplished by concentrating the solids for intermittent withdrawal or by continuous withdrawal of a portion of the slurry.

Other embodiments of the invention are defined by any two or more of the above limitations in combination.

The polymer made by the process of this invention can be made at particularly low densities with minimal fouling of the reactor system, thus resulting in improved operation efficiency, with low loss of heat transfer and extended run periods. Also, the invention provides for the production of polymers not typically capable of being produced in a slurry process thereby expanding the commercial grade slate from a particular process.

In addition to the production and recovery of polymer from the process, the invention provides for higher recovery of hydrocarbons that are recovered along with the polymer. Such hydrocarbons include non-polymerized materials, for example liquids, diluents, solvents, and unreacted monomers. Many of these non-polymerized materials are recovered at high efficiency and reused in the polymerization process.

Comonomers

Typical comonomers include those having from 2 to 30 carbon atoms, preferably 2 to 12 carbon atoms, and more preferably 2 to 8 carbon atoms. Useful monomers include linear, branched or cyclic olefins; linear branched or cyclic alpha olefins; linear, branched or cyclic diolefins; linear branched or cyclic alpha-omega olefins; linear, branched or cyclic polyenes; linear branched or cyclic alpha olefins. Particularly preferred monomers include one or more of ethylene, propylene, butene-1, pentene-1,4-methyl-pentene-1, hexene-1, octene-1, decene-1,3-methyl-pentene-1, norbornene, norbornadiene, 3,5,5-trimethyl-1-hexene, 5-ethyl-1-nonene, vinyl norbornene, ethylidene norbornene monomers. Particularly preferred is ethylene, either alone or with one or more co-monomers, to produce a homopolymer or a copolymer.

Cyclic containing monomers that can be used in the process of this invention include aromatic-group-containing monomers containing up to 30 carbon atoms and non aromatic cyclic group containing monomers containing up to 30 carbon atoms. Suitable aromatic-group-containing monomers comprise at least one aromatic structure, preferably from one to three, more preferably a phenyl, indenyl, fluorenyl, or naphthyl moiety.

The aromatic group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane and the like.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a preferred embodiment, the polymer produced herein is an ethylene homopolymer or copolymer. In a particularly preferred embodiment, the process of this invention relates to the polymerization of ethylene and one or more $C_3$ to $C_{20}$ linear, branched or cyclic monomers, preferably one or more $C_3$ to $C_{12}$ linear or branched alpha-olefins. In a particularly preferred embodiment, the comonomer comprises at least one comonomer having from 3 to 8 carbon atoms, preferably 4 to 7 carbon atoms. Particularly, the comonomers are selected from the group consisting of propylene, butene-1,4-methyl-pentene-1,3-methyl-pentene-1, hexene-1 and octene-1, the most preferred group being hexene-1, butene-1 and octene-1.

In another embodiment, ethylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, ethylene/propylene/hexene-1, ethylene/propylene/norbornene and the like.

In one embodiment, ethylene is present in the polymer at 50 mole % to 99.9 mole %, more preferably 70 to 98 mole %, more preferably 80 to 95 mole %. One or more comonomer(s) are present in the polymer at 0.1 mole % to 50 mole %, based upon the moles of all monomers present, more preferably 2 to 30 mole %, more preferably 5 to 20 mole %.

In another embodiment, the polymer produced herein comprises:
(a) ethylene present at from 40 to 100 mole %, alternatively 50 to 90 mole %, more alternatively 60 to 80 mole %, and
(b) a second olefin monomer present at from 5 to 60 mole %, alternatively 10 to 40 mole %, more alternatively 20 to 40 mole %, and optionally
(c) a third olefin monomer present at from 0 to 10 mole %, more alternatively from 0.5 to 5 mole %, more alternatively 1 to 3 mole %.

Diluent

The diluents used in this invention are beneficial in producing highly useful polymer products. Use of the diluents can also provide polymer processes having reduced fouling, higher overall efficiencies and/or reduced environmental emissions. The diluents of the invention are preferably compositions added to the reaction process that reduce the concentration of one or more active materials in the process to achieve the desired and beneficial effect. Preferably, the diluent comprises a hydrocarbon having little to no solvent power. More preferably, the diluent comprises a halogen containing, most preferably fluorinated hydrocarbon, compound, and preferably having little to no solvent power with respect to the polymer product. The fluorinated hydrocarbons may be used individually or as mixtures, and can be included in a mixture with non-fluorinated hydrocarbon diluents if desired.

According to this invention, fluorinated hydrocarbons are interchangeably referred to as hydrofluorocarbons or hydrofluorocarbon compounds or HFCs. These compounds have at least one carbon atom and at least one fluorine atom. The fluorinated hydrocarbon can be a perfluorinated hydrocarbon or the fluorinated hydrocarbon can optionally include one or more hydrogen atom(s). A perfluorinated hydrocarbon is a fluorocarbon in which the hydrogen directly attached to the carbon atom(s) is completely replaced by fluorine. See *Hawley's Condensed Chemical Dictionary*, Thirteenth Edition, Van Nostrand Renhold, 1997. Examples of preferred perfluorocarbons include linear branched or cyclic, $C_1$ to $C_{40}$ perfluoroalkanes.

In one embodiment, the fluorinated hydrocarbons are represented by the formula:

wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y is greater than or equal to 0 and z is an integer and at least one, more preferably, y and z are integers and at least one. In a preferred embodiment, z is 2 or more.

In one embodiment, a mixture of fluorinated hydrocarbons are used in the process of the invention, preferably a mixture of a perfluorinated hydrocarbon and a fluorinated hydrocarbon, and more preferably a mixture of a fluorinated hydrocarbon. In yet another embodiment, the fluorinated hydrocarbon is balanced or unbalanced in the number of fluorine atoms in the fluorinated hydrocarbon compound.

Non-limiting examples of fluorinated hydrocarbons include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,2,3,3,3,-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,4,4,-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane. In addition to those fluorinated hydrocarbons described herein, those fluorinated hydrocarbons described in Raymond Will, et. al., CEH Marketing Report, Fluorocarbons, Pages 1-133, by the Chemical Economics Handbook-SRI International, April 2001, which is fully incorporated herein by reference, are included. In another embodiment, the fluorocarbon is not a perfluorinated $C_4$ to $C_{10}$ alkane.

In another embodiment, the commercially available fluorinated hydrocarbons useful in the process of the invention include HFC-236fa having the chemical name 1,1,1,3,3,3,-hexafluoropropane, HFC-134a having the chemical name 1,1,1,2-tetrafluoroethane, HFC-245fa having the chemical name 1,1,1,3,3-pentafluoropropane, HFC-365mfc having the chemical name 1,1,1,3,3-pentafluorobutane, R-318 having the chemical name octafluorocyclobutane, and HFC-43-10mee having the chemical name 2,3-dihydrodecafluoropentane and/or HFC-365mfc, all of these are commercially available fluorinated hydrocarbons.

In another embodiment, the fluorocarbon is not a perfluorinated C4 to C10 alkane. In another embodiment, the fluorocarbon is not a perfluorinated hydrocarbon. In another embodiment, the fluorocarbon is not perfluorodecalin, perfluoroheptane, perfluorohexane, perfluoromethylcyclohexane, perfluorooctane, perfluoro-1,3-dimethylcyclohexane, perfluorononane, fluorobenzene, or perfluorotoluene. In a particularly preferred embodiment, the fluorocarbon consists essentially of hydrofluorocarbons.

In another embodiment the fluorocarbon is present at more than 1 weight %, based upon the weight of the fluorocarbon and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In another embodiment the fluorocarbon is present at more than 1 weight %, based upon the weight of the fluorocarbons, monomers and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In the event that the weight basis is not named for the weight % fluorocarbon, it shall be presumed to be based upon the total weight of the fluorocarbons, monomers and hydrocarbon solvents present in the reactor.

In another embodiment the fluorocarbon, preferably the hydrofluorocarbon, is present at more than 1 volume %, based upon the total volume of the fluorocarbon, monomers and any hydrocarbon solvent present in the reactor, preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In another embodiment the fluorocarbon is a blend of hydrofluorocarbon and perfluorocarbon, and preferably the hydrofluorocarbon is present at more than 1 volume %, based upon the total volume of the hydrofluorocarbon and perfluorocarbon present in the reactor (with the balance being made up by the perfluorocarbon), preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In yet another embodiment, the fluorinated hydrocarbons of the invention have a molecular weight (MW) greater than 30 a.m.u., preferably greater than 35 a.m.u, and more preferably greater than 40 a.m.u. In another embodiment, the fluorinated hydrocarbons of the invention have a MW greater than 60 a.m.u, preferably greater than 65 a.m.u, even more preferably greater than 70 a.m.u, and most preferably greater than 80 a.m.u. In still another embodiment, the fluorinated hydrocarbons of the invention have a MW greater than 90 a.m.u, preferably greater than 100 a.m.u, even more preferably greater than 135 a.m.u, and most preferably greater than 150 a.m.u. In another embodiment, the fluorinated hydrocarbons of the invention have a MW greater than 140 a.m.u, preferably greater than 150 a.m.u, more preferably greater than 180 a.m.u, even more preferably greater than 200 a.m.u, and most preferably greater than 225 a.m.u. In an embodiment, the fluorinated hydrocarbons of the invention have a MW in the range of from 30 a.m.u to 1000 a.m.u, preferably in the range of from 100 a.m.u to 500 a.m.u, more preferably in the range of from 100 a.m.u to 300 a.m.u, and most preferably in the range of from about 100 a.m.u to about 250 a.m.u.

In yet another embodiment, the fluorinated hydrocarbons of the invention have normal boiling point in the range of from about $-100°$ C. to $100°$ C. or the polymerization temperature (whichever is lower), preferably a polymerization temperature of about $70°$ C. to about $115°$ C., preferably the normal boiling point of the fluorinated hydrocarbons is in the range of from $-80°$ C. to about $90°$ C., more preferably from about $-60°$ C. to about $85°$ C., and most preferably from about $-50°$ C. to about $80°$ C. In an embodiment, the fluorinated hydrocarbons of the invention have normal boiling point greater than $-50°$ C., preferably greater than $-50°$ C. to less than $-10°$ C. In a further embodiment, the fluorinated hydrocarbons of the invention have normal boiling point less than $-5°$ C., preferably greater than $-5°$ C. to less than $-20°$ C. In one embodiment, the fluorinated hydrocarbons of the invention have normal boiling point greater than $-10°$ C., preferably greater than $-10°$ C. to about $60°$ C.

In another embodiment, the fluorinated hydrocarbons of the invention have a liquid density @ $20°$ C. (g/cc) of 2.0 g/cc or less, preferably 1.6 cc/g or less, and most preferably 1.5 g/cc or less. In one embodiment, the fluorinated hydrocarbons of the invention have a liquid density @ $20°$ C. (g/cc) less than 1.6 g/cc, preferably less than 1.55 g/cc, and most preferably less than 1.50 g/cc. In one embodiment, the fluorinated hydrocarbons of the invention have a liquid density @ $20°$ C. (g/cc) less than 1.50 g/cc, preferably less than 1.45, and most preferably less than 1.40 g/cc.

In one embodiment, the fluorinated hydrocarbons of the invention have a $\Delta H$ Vaporization at the normal boiling point as measured by standard calorimetry techniques in the range between 100 kJ/kg to less than 500 kJ/kg, preferably in the range of from 110 kJ/kg to less than 450 kJ/kg, and most preferably in the range of from 120 kJ/kg to less than 400 kJ/kg.

In another preferred embodiment, the diluent used in the invention comprises any combination of two or more fluorinated hydrocarbons having the aforementioned MW, normal boiling point, $\Delta H$ Vaporization, and liquid density values and ranges. In a preferred embodiment, the fluorinated hydrocarbons useful in the process of the invention have a MW greater than 30 a.m.u, preferably greater than 40 a.m.u, and a liquid density less than 2.0 g/cc, preferably less than 1.8 g/cc. In yet another preferred embodiment, the fluorinated hydrocarbons useful in the process of the invention have a liquid density less than 1.9 g/cc, preferably less than 1.8 g/cc, and a normal boiling point greater than $-100°$ C., preferably greater than $-30°$ C. up to the polymerization temperature of the process, which is as high as $100°$ C., preferably less than $90°$ C., and more preferably less than $85°$ C., and most preferably less than $80°$ C. In one embodiment, the fluorinated hydrocarbons useful in the process of the invention have a MW greater than 30 a.m.u, preferably greater than 40 a.m.u, and a $\Delta H$ Vaporization in the range of from 100 kj/kg to less than 500 kj/kg, and optionally a liquid density less than 2.0 g/cc, preferably less than 1.8 g/cc. In yet another embodiment, the fluorinated hydrocarbons useful in the process of the invention have a liquid density less than 1.9 g/cc, preferably less than 1.8 g/cc, and a normal boiling point greater than $-50°$ C., preferably greater than $-30°$ C. up to the polymerization temperature of the process, which is as high as $100°$ C., preferably less than $90°$ C., and more preferably less than $85°$ C., and most preferably less than $80°$ C., and optionally a $\Delta H$ Vaporization in the range of from 120 kj/kg to less than 400 kj/kg.

In yet another embodiment, the diluent includes one or more fluorinated hydrocarbon(s), alone or in combination, with one or more other typical inert hydrocarbon fluid(s) (non-fluorinated) are used in the process of the invention. Preferably, the hydrocarbon solvent is an aliphatic or aromatic hydrocarbon fluids. Examples of suitable, preferably inert, hydrocarbon fluids are readily volatile liquid hydrocarbons, which include, for example, saturated hydrocarbons containing from 1 to 50, preferably 3 to 20, carbon atoms. Preferred examples include propane, n-butane, isobutane (MW of 58.12 a.m.u., a liquid density of 0.55 g/cc, and normal boiling point as above described of $-11.75$), n-pentane, isopentane (MW of 72.15 a.m.u., a liquid density of 0.62 g/cc, and normal boiling point of 27.85), neopentane, n-hexane, cyclohexane, isohexane, octane, and other saturated C6 to C8 hydrocarbons. Preferred hydrocarbon fluids also include alkanes (preferably C1 to C8 alkanes), such as propane, isobutane, mixed butanes, hexane, pentane, isopentane, desulphurized light virgin naphtha, cyclohexane and octane, are preferred. In one embodiment, the diluent further comprises at least one C1 to C40 alkane, alternatively C2 to C8 alkane.

According to another embodiment of the invention, the diluent comprises a mixture of at least one inert hydrocarbon fluid (non-fluorinated) and at least one fluorinated hydrocarbon, wherein the mixture has a density @ $20°$ C. (g/cc) in the range of from 0.2 g/cc less than to 0.2 g/cc greater than the density of the polymer, alternatively from 0.1 g/cc less than to 0.1 g/cc greater than the density of the polymer, alternatively from 0.05 g/cc less than to 0.05 g/cc greater than the density of the polymer.

In another embodiment the fluorocarbon is present at more than 5 weight %, based upon the weight of the fluorocarbon and any hydrocarbon solvent present in the reactor, preferably greater than 7 weight %, preferably greater than 10 weight %, preferably greater than 15 weight %.

In another embodiment, the diluent is selected based upon its solubility or lack thereof in a particular polymer being produced. Preferred diluents have little to no solubility in the polymer. Solubility in the polymer is measured by forming the polymer into a film of thickness between 50 and 100 microns, then soaking it in diluent (enough to cover the film) for 4 hours at the relevant desired temperature in a sealed container or vessel. The film is removed from the diluent, exposed for 90 seconds to evaporate excess diluent from the surface of the film, and weighed. The mass uptake is defined as the percentage increase in the film weight after soaking. The diluent or diluent mixture is selected so that the polymer has a mass uptake of less than 4 weight %, preferably less than 3 weight %, more preferably less than 2 weight %, even more preferably less than 1 weight %, and most preferably less than 0.5 weight %.

Ideally, the fluorocarbon is inert to the polymerization reaction. By "inert to the polymerization reaction" is meant that the fluorocarbon does not react chemically with the, monomers, catalyst system or the catalyst system components. (This is not to say that the physical environment provided by an fluorocarbons does not influence the polymerization reactions, in fact, it may do so to some extent, such as affecting activity rates. However, it is meant to say that the fluorocarbons are not present as part of the catalyst system.)

In a preferred embodiment, the diluent(s) or mixtures thereof, preferably, the fluorinated hydrocarbon(s) or mixtures thereof, are selected such that the polymer melting temperature Tm is reduced (or depressed) by not more than 15° C. by the presence of the diluent. The depression of the polymer melting temperature ΔTm is determined by first measuring the melting temperature of a polymer by differential scanning calorimetry (DSC), and then comparing this to a similar measurement on a sample of the same polymer that has been soaked with the diluent. In general, the melting temperature of the soaked polymer will be lower than that of the dry polymer. The difference in these measurements is taken as the melting point depression ΔTm. It is well known to those in the art that higher concentrations of dissolved materials in the polymer cause larger depressions in the polymer melting temperature (i.e. higher values of ΔTm). A suitable DSC technique for determining the melting point depression is described by, P. V. Hemmingsen, "Phase Equilibria in Polyethylene Systems", Ph.D Thesis, Norwegian University of Science and Technology, March 2000, which is incorporated herein by reference. (A preferred set of conditions for conducting the tests are summarized on Page 112 of this reference.) The polymer melting temperature is first measured with dry polymer, and then repeated with the polymer immersed in liquid (the diluent to be evaluated). As described in the reference above, it is important to ensure that the second part of the test, conducted in the presence of the liquid, is done in a sealed container so that the liquid is not flashed during the test, which could introduce experimental error. In one embodiment, the ΔTm is less than 12° C., preferably less than 10° C., preferably less than 8° C., more preferably less than 6° C., and most preferably less than 4° C. In another embodiment, the measured ΔTm is less than 5° C., preferably less than 4° C., more preferably less than 3° C., even more preferably less than 2° C., and most preferably less than 1° C.

Catalyst Components and Catalyst Systems

All bulky ligand metallocene-type polymerization catalysts are suitable for use in the polymerization process of the invention. The following is a non-limiting discussion of the various bulky ligand metallocene-type polymerization catalysts useful in the process of the invention. All numbers and references to the Periodic Table of Elements is based on the notation as set out in Chemical and Engineering News, 63(5), 27 (1985).

Bulky Ligand Metallocene-Type Catalyst Compounds

Generally, polymerization catalysts useful in the invention include one or more bulky ligand metallocene compounds (also referred to herein as metallocenes). Typical bulky ligand metallocene compounds are generally described as containing one or more bulky ligand(s) and one or more leaving group(s) bonded to at least one metal atom. The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements; preferably the atoms are selected from the group consisting of carbon, nitrogen, oxygen, silicon, sulfur, phosphorous, germanium, boron and aluminum or a combination thereof. Most preferably, the ring(s) or ring system(s) are composed of carbon atoms such as, but not limited to, those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

Exemplary of these bulky ligand metallocene-type catalyst compounds and catalyst systems are described in for example, U.S. Pat. Nos. 4,530,914, 4,871,705, 4,937,299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753 and 5,770,664 all of which are herein fully incorporated by reference. Also, the disclosures of European publications EP-A-0 591 756, EP-A-0 520 732, EP-A-0 420 436, EP-B1 0 485 822, EP-B1 0 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455, WO 98/06759 and WO 98/011144 are all herein fully incorporated by reference for purposes of describing typical bulky ligand metallocene-type catalyst compounds and catalyst systems.

In one embodiment, the polymerization catalyst useful in the process of the invention includes one or more bulky ligand metallocene catalyst compounds represented by the formula:

$$L^A L^B MQ_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of π-bonding to M. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of Formula V only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that Formula V above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the polymerization catalysts useful in the process of the invention may include one or more bulky ligand metallocene catalyst compounds where $L^A$ and $L^B$ of Formula V are bridged to each other by at least one bridging group, A, as represented by:

$$L^A A L^B M Q_n \qquad (II)$$

wherein $L^A$, $L^B$, M, Q and n are as defined above. These compounds of Formula VI are known as bridged, bulky ligand metallocene catalyst compounds. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si\ R'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula I have two or more bridging groups A (EP-B1-0 664 301, which is incorporated herein by reference).

In another embodiment, the bulky ligand metallocene catalyst compounds are those where the R substituents on the bulky ligands $L^A$ and $L^B$ of Formulas I and II are substituted with the same or different number of substituents on each of the bulky ligands. In another embodiment, the bulky ligands $L^A$ and $L^B$ of Formulas I and II are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In another embodiment, the catalyst compositions of the invention may include bridged heteroatom, mono-bulky ligand metallocene compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198, 401, 5,227,440 and 5,264,405 and European publication EP-A-0 420 436, all of which are herein fully incorporated by reference.

In another embodiment, the polymerization catalyst useful in the process of the invention includes one or more bulky ligand metallocene catalyst compounds represented by Formula III:

$$L^C AJMQ_n \qquad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to J and $L^C$; J is a heteroatom ancillary ligand; and A is a bridging group; Q is a univalent anionic ligand; and n is the integer 0, 1 or 2. In Formula III above, $L^C$, A and J form a fused ring system.

In Formula III, J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred. Preferably, when the catalyst system comprises compounds represented by Formula III, the fluorocarbon is not a perfluorocarbon.

In an embodiment of the invention, the bulky ligand metallocene catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in PCT Publication Nos. WO 96/33202, WO 96/34021, WO 97/17379 and WO 98/22486 and EP-A1-0 874 005 and U.S. Pat. Nos. 5,233,049, 5,539,124, 5,554,775, 5,637,660, 5,744,417, 5,756,611 and 5,856,258 all of which are herein incorporated by reference.

In another embodiment, the bulky ligand metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In another embodiment, the polymerization catalysts useful in the process of the invention includes one or more bulky ligand metallocene catalyst compounds represented by Formula IV:

$$L^D MQ_2(YZ)X_n \qquad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a ligand, preferably a unicharged polydentate ligand; or Q is a univalent anionic ligand also bonded to M; X is a univalent anionic group when n is 2 or X is a divalent anionic group when n is 1; n is 1 or 2.

In Formula IV, L and M are as defined above for Formula I. Q is as defined above for Formula I, preferably Q is selected from the group consisting of —O—, —NR—, —CR2- and —S—; Y is either C or S; Z is selected from the group consisting of —OR, —NR2, —CR3, —SR, —SiR3, —PR2, —H, and substituted or unsubstituted aryl groups, with the proviso that when Q is —NR— then Z is selected from one of the group consisting of —OR, —NR2, —SR, —SiR3, —PR2 and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

Still other useful polymerization catalysts include those multinuclear metallocene catalysts as described in PCT Publication No. WO 99/20665 and U.S. Pat. No. 6,010,794, and transition metal metaaracyle structures described in EP-A2-0 969 101, which are herein incorporated herein by reference. Other metallocene catalysts include those described in EP-A1-0 950 667, double cross-linked metallocene catalysts (EP-A1-0 970 074), tethered metallocenes (EP-A2-0 970 963) and those sulfonyl catalysts described in U.S. Pat. No. 6,008,394, which are incorporated herein by reference.

It is also contemplated that in one embodiment the bulky ligand metallocene catalysts, described above, include their structural or optical or enantiomeric isomers (meso and racemic isomers, for example see U.S. Pat. No. 5,852,143, incorporated herein by reference), chiral, achiral, and mixtures thereof.

In another embodiment, the bulky ligand type metallocene-type catalyst compound is a complex of a transition metal, a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In one embodiment, the bulky ligand metallocene catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT Publications Nos. WO 96/33202, WO 99/01481 and WO 98/42664, and U.S. Pat. No. 5,637,660, which are fully incorporated herein by reference.

In one embodiment, these catalyst compounds are represented by the formula:

$$((Z)XA_t(YJ))_q MQ_n \qquad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional.

In another embodiment, where X is nitrogen or phosphorous then Z is present. In an embodiment, Z is preferably an aryl group, more preferably a substituted aryl group.

In another embodiment of the invention the bulky ligand metallocene-type catalyst compounds are those nitrogen containing heterocyclic ligand complexes, also known as transition metal catalysts based on bidentate ligands containing pyridine or quinoline moieties, such as those described in WO 96/33202, WO 99/01481 and WO 98/42664 and U.S. Pat. No. 5,637,660, which are herein all incorporated by reference.

It is within the scope of this invention, in one embodiment, the polymerization catalysts useful in the process of the invention include complexes of $Ni^{2+}$ and $Pd^{2+}$ described in the articles Johnson, et al., "New Pd(II)- and Ni(II)-Based Catalysts for Polymerization of Ethylene and a-Olefins", *J. Am. Chem. Soc.* 1995, 117, 6414-6415 and Johnson, et al., "Copolymerization of Ethylene and Propylene with Functionalized Vinyl Monomers by Palladium(II) Catalysts", *J. Am. Chem. Soc.*, 1996, 118, 267-268, and WO 96/23010 published Aug. 1, 1996, WO 99/02472, U.S. Pat. Nos. 5,852, 145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene-type catalyst compounds useful herein are those diimine based ligands for Group 8 to 10 metal compounds disclosed in PCT publications WO 96/23010 and WO 97/48735 and Gibson, et. al., *Chem. Comm.*, pp. 849-850 (1998), all of which are herein incorporated by reference.

Other bulky ligand metallocene-type catalysts useful herein are those Group 5 and 6 metal imido complexes described in EP-A2-0 816 384 and U.S. Pat. No. 5,851,945, which is incorporated herein by reference. In addition, bulky ligand metallocene-type catalysts useful herein include bridged bis(arylamido) Group 4 compounds described by D. H. McConville, et al., in Organometallics 1195, 14, 5478-5480, which is herein incorporated by reference. Other bulky ligand metallocene-type catalysts useful herein are described as bis(hydroxy aromatic nitrogen ligands) in U.S. Pat. No. 5,852,146, which is incorporated herein by reference. Other metallocene-type catalysts containing one or more Group 15 atoms useful herein include those described in WO 98/46651, which is herein incorporated herein by reference. Still another metallocene-type bulky ligand metallocene-type catalysts useful herein include those multinuclear bulky ligand metallocene-type catalysts as described in WO 99/20665, which is incorporated herein by reference. In addition, useful Group 6 bulky ligand metallocene catalyst systems are described in U.S. Pat. No. 5,942,462, which is incorporated herein by reference.

It is contemplated in some embodiments, that the bulky ligands of the metallocene-type catalyst compounds of the invention described above may be asymmetrically substituted in terms of additional substituents or types of substituents, and/or unbalanced in terms of the number of additional substituents on the bulky ligands or the bulky ligands themselves are different.

Mixed Catalysts

It is also within the scope of this invention that the above described bulky ligand metallocene-type catalyst compounds can be combined with one or more of the conventional-type transition metal catalysts compounds with one or more co-catalysts or activators or activation methods described above. For example, see U.S. Pat. Nos. 4,937,299, 4,935,474, 5,281, 679, 5,359,015, 5,470,811, and 5,719,241, all of which are fully incorporated herein by reference.

In another embodiment of the invention one or more bulky ligand metallocene-type catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated herein by reference.

Activator and Activation Methods

The above described polymerization catalysts, particularly bulky ligand metallocene-type catalyst, are typically activated in various ways to yield polymerization catalysts having a vacant coordination site that will coordinate, insert, and polymerize olefin(s).

For the purposes of this invention, the term "activator" is defined to be any compound which can activate any one of the polymerization catalyst compounds described herein by converting the neutral polymerization catalyst compound to a catalytically active catalyst cation compound. Non-limiting activators, for example, include alumoxanes, aluminum alkyls, ionizing activators, which may be neutral or ionic, and conventional-type cocatalysts.

Alumoxanes

In one embodiment, alumoxane activators are utilized as an activator with the bulky ligand metallocene-type polymerization catalysts useful in the process of the invention. Alumoxanes are generally oligomeric compounds containing —Al (R)—O— subunits, where R is an alkyl group. Non-limiting examples of alumoxanes include methylalumoxane (MAO), modified methylalumoxane (MMAO), ethylalumoxane and isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. Another alumoxane is a modified methyl alumoxane (MMAO) cocatalyst type 3A (commercially available from Akzo Chemicals, Inc. under the trade name Modified Methylalumoxane type 3A; see U.S. Pat. No. 5,041,584). Aluminum alkyl or organoaluminum compounds which may be utilized as activators include trimethylaluminum, triethylaluminum, triisobutylaluminum, tri-n-hexylaluminum, tri-n-octylaluminum and the like.

Ionizing Activators

It is within the scope of this invention to use an ionizing or stoichiometric activator, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators.

Non-limiting examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds for the polymerization catalysts described above may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198, 401, 5,066,741, 5,206,197, 5,241,025, 5,384,299 and 5,502, 124 and U.S. patent application Ser. No. 08/285,380, filed Aug. 3, 1994, all of which are herein fully incorporated by reference.

In a preferred embodiment, the stoichiometric activators include a cation and an anion component, and may be represented by the following formula:

$$(L-H)_d^+ \cdot (A^{d-}) \quad (VI)$$

wherein: L is a neutral Lewis base; H is hydrogen; $(L-H)^+$ is a Bronsted acid; $A^{d-}$ is a non-coordinating anion having the charge d−; and d is an integer from 1 to 3. The cation component, $(L-H)_d^+$ may include Bronsted acids such as protons or protonated Lewis bases or reducible catalysts capable of protonating or abstracting a moiety, such as an alkyl or aryl, from the bulky ligand metallocene or Group 15 containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene and mixtures thereof. The activating cation $(L-H)_d^+$ may also be an abstracting moiety such as silver, carboniums, tropylium, carbeniums, ferroceniums and mixtures, preferably carboniums and ferroceniums. Most preferably $(L-H)_d^+$ is triphenyl carbonium.

The anion component $A^{d-}$ includes those having the formula $[M^{k+}Q_n]^{d-}$ wherein k is an integer from 1 to 3; n is an integer from 2-6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Most preferably, the ionic stoichiometric activator $(L-H)_d^+ \cdot (A^{d-})$ is N,N-dimethylanilinium tetra(perfluorophenyl)borate or triphenylcarbenium tetra(perfluorophenyl)borate.

In one embodiment, an activation method using ionizing ionic compounds not containing an active proton but capable of producing a bulky ligand metallocene catalyst cation and their non-coordinating anion are also contemplated, and are described in EP-A-0 426 637, EP-A-0 573 403 and U.S. Pat. No. 5,387,568, which are all herein incorporated by reference.

Additional Activators

Other activators include those described in PCT Publication No. WO 98/07515 such as tris (2,2',2"-nonafluorobiphenyl) fluoroaluminate, which publication is fully incorporated herein by reference. Combinations of activators are also contemplated by the invention, for example, alumoxanes and ionizing activators in combinations, see for example, EP-B1-0573 120, PCT Publications Nos. WO 94/07928 and WO 95/14044 and U.S. Pat. Nos. 5,153,157 and 5,453,410, all of which are herein fully incorporated by reference.

Other suitable activators are disclosed in PCT Publication No. WO 98/09996, incorporated herein by reference, which describes activating bulky ligand metallocene catalyst compounds with perchlorates, periodates and iodates including their hydrates. WO 98/30602 and WO 98/30603, incorporated by reference, describe the use of lithium (2,2'-bisphenyl-ditrimethylsilicate).4THF as an activator for a bulky ligand metallocene catalyst compound. PCT Publication No. WO 99/18135, incorporated herein by reference, describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral bulky ligand metallocene catalyst compound or precursor to a bulky ligand metallocene cation capable of polymerizing olefins.

Other activators or methods for activating a bulky ligand metallocene catalyst compound are described in for example, U.S. Pat. Nos. 5,849,852, 5,859,653 and 5,869,723 and WO 98/32775, WO 99/42467 (dioctadecylmethylammonium-bis (tris(pentafluorophenyl)borane) benzimidazolide), which are herein incorporated by reference.

Another suitable ion forming, activating cocatalyst comprises a salt of a cationic oxidizing agent and a noncoordinating, compatible anion represented by the formula:

$$(OX^{e+})_d(A^{d-})_e \quad (VII)$$

wherein: $OX^{e+}$ is a cationic oxidizing agent having a charge of e+; e is an integer from 1 to 3; and $A^-$, and d are as previously defined above. Non-limiting examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activators, especially tetrakis(pentafluorophenyl)borate.

It within the scope of this invention that any of the polymerization catalysts described above can be combined one or more activators or activation methods described above. For example, a combination of activators have been described in U.S. Pat. Nos. 5,153,157 and 5,453,410, European publication EP-B1 0 573 120, and PCT publications WO 94/07928 and WO 95/14044. These documents all discuss the use of an alumoxane and an ionizing activator with a bulky ligand metallocene catalyst compound.

Supported Activators

Many supported activators are useful in combination with one or more of the bulky ligand metallocene-type catalysts described above. A supported activator is where any one or more of the activators described above is supported on any one or more of the support materials described below. Non-limiting supported activators and methods for making them are described in various patents and publications which include: U.S. Pat. Nos. 4,871,705, 4,912,075, 4,935,397, 4,937,217, 4,937,301, 5,008,228, 5,015,749, 5,026,797, 5,057,475, 5,086,025, 5,147,949, 5,212,232, 5,229,478, 5,288,677, 5,332,706, 5,420,220, 5,427,991, 5,446,001, 5,468,702, 5,473,028, 5,534,474, 5,602,067, 5,602,217, 5,643,847, 5,728,855, 5,731,451, 5,739,368, 5,756,416, 5,777,143, 5,831,109, 5,856,255, 5,902,766, 5,910,463, 5,968,864 and 6,028,151 6,147,173; PCT Publications Nos. WO 94/26793, WO 96/16092, WO 98/02246 and WO 99/03580; and European Publication Nos. EP-B1-0 662 979, EP 0 747 430 A1, EP 0 969 019 A1, EP-B2-0 170 059, EP-A1-0 819 706 and EP-A1-0 953 581, which are all herein fully incorporated herein by reference.

Method for Supporting

The above described bulky ligand metallocene-type catalyst compounds and catalyst systems may be combined with one or more support materials or carriers using one of the support methods well known in the art or as described below. In the preferred embodiment, the polymerization catalyst is in a supported form. For example, in a preferred embodiment, a bulky ligand metallocene-type catalyst compound or catalyst system is in a supported form, for example deposited on, contacted with, or incorporated within, adsorbed or absorbed in a support or carrier.

The terms "support" or "carrier" are used interchangeably and are any porous or non-porous support material, preferably a porous support material, for example, talc, inorganic oxides and inorganic chlorides. Other carriers include resinous support materials such as polystyrene, a functionalized or crosslinked organic supports, such as polystyrene divinyl benzene polyolefins or polymeric compounds, or any other organic or inorganic support material and the like, or mixtures thereof.

The preferred carriers are inorganic oxides that include those Group 2, 3, 4, 5, 13 or 14 metal oxides. The preferred supports includes silica, alumina, silica-alumina, magnesium chloride, and mixtures thereof. Other useful supports include magnesia, titania, zirconia, montmorillonite and the like. Also, combinations of these support materials may be used, for example, silica-chromium and silica-titania.

It is preferred that the carrier, preferably an inorganic oxide, has a surface area in the range of from about 10 to about 700 $m^2/g$, pore volume in the range of from about 0.1 to about 4.0 cc/g and average particle size in the range of from about 10 to about 500 μm. More preferably, the surface area of the carrier is in the range of from about 50 to about 500 $m^2/g$, pore volume of from about 0.5 to about 3.5 cc/g and average particle size of from about 20 to about 200 μm. Most preferably the surface area of the carrier is in the range of from about 100 to about 400 $m^2/g$, pore volume from about 0.8 to about 3.0 cc/g and average particle size is from about 20 to about 100 μm. The average pore size of a carrier of the invention is typically in the range of from about 10 Å to 1000 Å, preferably 50 Å to about 500 Å, and most preferably 75 Å to about 350 Å.

Examples of supporting the bulky ligand metallocene-type catalyst systems of the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,648,310, 5,665,665, 5,698,487, 5,714,424, 5,723,400, 5,723,402, 5,731,261, 5,743,202, 5,759,940, 5,767,032, 5,688,880, 5,770,755 and 5,770,664, and U.S. application Ser. Nos. 08/271,598 filed Jul. 7, 1994 and 08/788,736 filed Jan. 23, 1997 and PCT publications WO 95/32995, WO 95/14044, WO 96/06187, WO96/11960 and WO96/00243, which are herein fully incorporated by reference.

In one preferred embodiment, the support materials are treated chemically, for example with a fluoride compound as described in PCT Publication No. WO 00/12565, which is herein incorporated by reference. Other supported activators are described in for example PCT Publication No. WO 00/13792 that refers to supported boron containing solid acid complex.

In one embodiment of the invention, olefin(s), preferably $C_2$ to $C_{30}$ olefin(s) or alpha-olefin(s), preferably ethylene or propylene or combinations thereof are prepolymerized in the presence of the bulky ligand metallocene-type catalyst system prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,921,825, 5,204,303, 5,283,278, 5,322,830, 5,705,578, 6,391,987, 6,531,553, and 6,610,799, European Publication EP-B-0279 863 and PCT Publication No. WO 97/44371, all of which are herein fully incorporated by reference. In a gas phase prepolymerization process it is preferred to use a fluorinated hydrocarbon as a diluent, alone or in combination with other liquids. A prepolymerized catalyst system for purposes of this patent specification and appended claim is a supported catalyst system.

In one embodiment the polymerization catalyst is used in an unsupported form, preferably in a liquid form such as described in U.S. Pat. Nos. 5,317,036 and 5,693,727, PCT publication WO 97/46599 and European publication EP-A-0 593 083, all of which are herein incorporated by reference.

Spray Dried Catalysts

In another embodiment, the catalyst compounds described are combined with support material(s) and/or activator(s) and spray dried. In another embodiment, the catalyst compounds and/or the activators are combined with a support material such as a particulate filler material and then spray dried, preferably to form a free flowing powder.

Spray drying may be by any means known in the art. Please see EP A 0 668 295 B1, U.S. Pat. No. 5,674,795 and U.S. Pat. No. 5,672,669 and U.S. patent application Ser. No. 09/464, 114 filed Dec. 16, 1999, which particularly describe spray drying of supported catalysts. In general one may spray dry the catalysts by placing the catalyst compound and the optional activator in solution (allowing the catalyst compound and activator to react, if desired), adding a filler material such as silica or fumed silica, such as Gasil™ or Cabosil™, then forcing the solution at high pressures through a nozzle. The solution may be sprayed onto a surface or sprayed such that the droplets dry in midair. The method generally employed is to disperse the silica in toluene, stir in the activator solution, and then stir in the catalyst compound solution. Typical slurry concentrations are about 5 to 8 weight %. This formulation may sit as a slurry for as long as 30 minutes with mild stirring or manual shaking to keep it as a suspension before spray-drying. In one preferred embodiment, the makeup of the dried material is about 40-50 weight % activator (preferably alumoxane), 50-60 $SiO_2$ and about ~2 weight % catalyst compound.

In another embodiment, fumed silica such as such as Gasil™ or Cabosil™ may be added to a solution containing a catalyst compound such that when that solution is added to the catalyst component slurry or injected into a polymerization reactor, the fumed silica acts as a template for "in situ spray" drying.

For simple catalyst compound mixtures, the two or more catalyst compounds can be added together in the desired ratio in the last step. In another embodiment, more complex procedures are possible, such as addition of a first catalyst compound to the activator/filler mixture for a specified reaction time t, followed by the addition of the second catalyst compound solution, mixed for another specified time x, after which the mixture is cosprayed. Lastly, another additive, such as 1-hexene in about 10 volume percent can be present in the activator/filler mixture prior to the addition of the first metal catalyst compound.

In another embodiment binders are added to the mix. These can be added as a means of improving the particle morphology, i.e. narrowing the particle size distribution, lower porosity of the particles and allowing for a reduced quantity of alumoxane, which is acting as the 'binder'.

In another embodiment a solution of a bulky ligand metallocene compound and optional activator can be combined with a different slurried spray dried catalyst compound and then introduced into a reactor.

The spray dried particles are generally fed into the polymerization reactor as a mineral oil slurry. Solids concentrations in oil are about 10 to 30 weight %, preferably 15 to 25 weight %. In some embodiments, the spray dried particles can be from less than about 10 micrometers in size up to about 100 micrometers, compared to conventional supported catalysts which are about 50 micrometers. In a preferred embodiment the support has an average particle size of 1 to 50 microns, preferably 10 to 40 microns.

Catalyst Slurry and Solution Components

The catalyst of the invention can be added to the reaction system in the form of a slurry or a solution or a combination of slurry and solution. In one embodiment, the catalyst in slurry form and includes an activator and a support, or a supported activator. In another embodiment, the catalyst slurry includes fumed silica. In another embodiment, the slurry includes a catalyst compound in addition to the activator and the support and/or the supported activator. In one embodiment, the catalyst compound in the slurry is supported.

In another embodiment, the slurry includes one or more activator(s) and support(s) and/or supported activator(s) and/or one or more catalyst compound(s). For example, the slurry may include two or more activators (such as a supported alumoxane and a modified alumoxane) and a catalyst compound, or the slurry may include a supported activator and more than one catalyst compounds. Preferably, the slurry comprises a supported activator and two catalyst compounds.

In another embodiment the slurry comprises supported activator and two different catalyst compounds, which may be added to the slurry separately or in combination.

In another embodiment the slurry, containing a supported alumoxane, is contacted with a catalyst compound, allowed to react, and thereafter the slurry is contacted with another catalyst compound. In another embodiment the slurry containing a supported alumoxane is contacted with two catalyst compounds at the same time, and allowed to react.

In another embodiment the molar ratio of metal in the activator to metal in the catalyst compound in the slurry is 1000:1 to 0.5:1, preferably 300:1 to 1:1, more preferably 150:1 to 1:1.

In another embodiment the slurry contains a support material which may be any inert particulate carrier material known in the art, including, but not limited to, silica, fumed silica, alumina, clay, talc or other support materials such as disclosed above. In a preferred embodiment, the slurry contains a supported activator, such as those disclosed above, preferably methyl alumoxane and/or modified methyl alumoxane on a support of silica.

A catalyst slurry can be prepared by suspending the catalyst components, preferably the support, the activator and optional catalyst compounds in a liquid diluent. The liquid diluent can be a hydrocarbon or a flourinated hydrocarbon, as described for the slurry process diluent. The liquid diluent is typically an alkane having from 3 to 60 carbon atoms, preferably having from 5 to 20 carbon atoms, preferably a branched alkane, or an organic composition such as mineral oil or silicone oil. The diluent employed is preferably liquid under the conditions of polymerization and relatively inert. The concentration of the components in the slurry is controlled such that a desired ratio of catalyst compound(s) to activator, and/or catalyst compound to catalyst compound is fed into the reactor. Typically, as a slurry, the catalyst compound and the support and activator, or supported activator, and the slurry diluent are allowed to contact each other for a time sufficient for at least 50% of the catalyst compounds to be deposited into or on the support, preferably at least 70%, preferably at least 75%, preferably at least 80%, more preferably at least 90%, preferably at least 95%, preferably at least 99%. In an embodiment, the slurry is prepared prior to its use in the catalyst feed system. Times allowed for mixing are up to 10 hours, typically up to 6 hours, more typically 4 to 6 hours. In one embodiment of this invention a catalyst compound will be considered to be in or on the support if the concentration of the catalyst compound in the liquid portion of the slurry is reduced over time after adding the catalyst compound to the slurry. Concentration of the catalyst compound in the liquid diluent may be measured for example, by inductively coupled plasma spectroscopy (ICPS), or by ultraviolet (UV) spectroscopy, after standardization with a calibration curve prepared at the appropriate concentration range, as is known in the art. Thus for example, 70% of a catalyst compound will be considered to have deposited in or on a support if the concentration of the catalyst compound in the liquid (not including the support) is reduced by 70% from its initial concentration.

In one embodiment, the catalyst compounds are added to the slurry as a solution, slurry, or powder. The slurry may be prepared prior to its use in the polymerization process of the invention or it may be prepared in-line.

In one embodiment, the slurry is prepared by combining the catalyst components, such as for example the catalyst or supported catalyst and the support and activator or supported activator, all at once. In another embodiment, the slurry is prepared by first adding a support material, then adding the combination of a catalyst and an activator component.

In another embodiment the slurry comprises a supported activator and at least one catalyst compound where the catalyst compound is combined with the slurry as a solution. A preferred solvent is mineral oil.

In a another embodiment, alumoxane, preferably methyl alumoxane or modified methyl alumoxane, is combined with a support such as calcined silica or fumed silica to form a supported activator, the supported activator is then dispersed in a liquid, such as degassed mineral oil, and then one or more catalyst compounds are added to the dispersion and mixed to form the catalyst component slurry. The catalyst compounds are preferably added to the dispersion as a solid, powder, solution or a slurry, preferably a slurry of mineral oil. If more than one catalyst compound is added to the dispersion, the catalyst compounds can be added sequentially, or at the same time.

In a preferred embodiment the slurry comprises mineral oil and has a viscosity of about 130 to about 2000 cP at 20° C., more preferably about 180 to about 1500 cP at 20° C. and even more preferably about 200 to about 800 cP at 20° C. as measured with a Brookfield model LVDV-III Rheometer housed in a nitrogen purged drybox (in such a manner that the atmosphere is substantially free of moisture and oxygen, i.e. less than several ppmv of each). The slurry can be made in a nitrogen purged drybox, and rolled in closed glass containers until immediately before the viscosity measurements are made, in order to ensure that it is fully suspended at the start of the trial.

In one embodiment, the slurry comprises a supported activator and one or more or a combination of the catalyst compound(s). In another embodiment, the slurry comprises a supported activator and one or more or combination of the bulky ligand catalyst compound(s) represented by Formula I to V described above.

In one embodiment, the catalyst is added to the reaction system as a solution that includes a catalyst compound. In another embodiment, the solution also includes an activator in addition to the catalyst compound.

The solution used in the process of this invention is typically prepared by dissolving the catalyst compound and optional activators in a liquid solvent. The liquid solvent is typically an alkane, such as a $C_5$ to $C_{30}$ alkane, preferably a $C_5$ to $C_{10}$ alkane. Cyclic alkanes such as cyclohexane and aromatic compounds such as toluene may also be used. In addition, mineral oil may be used as a solvent. The solution employed should be liquid under the conditions of polymerization and relatively inert. In one embodiment, the liquid utilized in the solution is different from the diluent used in the slurry. In another embodiment, the liquid utilized in the solution is the same as the diluent used in the slurry.

In a preferred embodiment the ratio of metal in the activator to metal in the catalyst compound in the solution is 1000:1 to 0.5:1, preferably 300:1 to 1:1, more preferably 150:1 to 1:1.

In a preferred embodiment, the activator and catalyst compound is present in the solution at up to about 90 weight %, preferably at up to about 50 weight %, preferably at up to about 20 weight %, preferably at up to about 10 weight %, more preferably at up to about 5 weight %, more preferably at less than 1 weight %, more preferably between 100 ppm and 1 weight % based upon the weight of the solvent and the activator or catalyst compound.

In one embodiment, the solution comprises a bulky ligand catalyst compound represented by Formula I to V described above.

In the polymerization process of the invention, any catalyst solutions may be combined with any catalyst containing slurry. In addition, more than one catalyst component may be utilized.

Processes

General Process Conditions and Reactor Systems

This invention pertains to any prepolymerization and/or polymerization process, and the process is suitably carried out over a wide range of temperatures and pressures. Such processes include, for example, loop slurry and stirred tank reactor processes. Either process can be used in combination with a centrifuge, a one-stage flash, a two-stage flash or any combination thereof for recovery of diluent from the polymer product and recirculation of the diluent back in to the polymerization process after any desired purification steps.

Desirably, little to no polymer "swelling" is exhibited as indicated by little or no suppression of the polymer glass transition temperature, Tg, or the melting point, Tm, and/or little or no diluent mass uptake. Thus, polymerization in the diluents of the present invention provides for high polymer concentration to be handled at low viscosity with good heat transfer, reduced reactor fouling, homogeneous polymerization and/or the convenience of subsequent reactions to be run directly on the resulting polymer mixture.

Polymerization processes according to this invention are carried out at any temperature or temperature range effective in carrying out the polymerization process. In general, effective temperatures range from about 0° C. to 200° C., preferably from about 25° C. to about 180° C., preferably from about 30° C. to 140° C., preferably from about 40° C. to 125° C., more preferably from about 50° C. to 110° C. The upper temperature will be limited to at least 1° C. below the polymer melting point.

Polymerization processes according to this invention are carried out at any pressure or pressure range effective in carrying out the polymerization process. The pressures employed may be in the range from 1 mm Hg (133 Pa) to about 3500 bar (350 MPa), preferably from 0.5 bar (50 kPa) to about 500 bar (50 MPa), more preferably from about 1 bar (100 kPa) to about 100 bar (10 MPa), and most preferably from about 5 bar to about 50 bar (5 MPa).

In one embodiment of the invention, olefin(s), preferably $C_2$ to $C_{30}$ olefin(s) or alpha-olefin(s), preferably ethylene, or combinations thereof are prepolymerized in the presence of the metallocene catalyst systems of the invention described above prior to the main polymerization. In one embodiment, the prepolymerization process is carried out in a slurry phase at effective prepolymerization temperatures and pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

The prepolymerization and/or polymerization process can be carried out in a batch or continuous process. By continuous is meant a system that operates (or is intended to operate) without interruption or cessation. For example a continuous process to produce a polymer would be one in which the reactants are continuously introduced into one or more reactors and polymer product is continually withdrawn. In a preferred embodiment any of the polymerization process of the invention is a continuous process.

The reactor used in the polymerization process of this invention, will contain sufficient amounts of the catalyst system effective to catalyze the polymerization of the monomer containing feed-stream such that a sufficient amount of polymer having desired characteristics is produced. The feed stream in one embodiment contains a total monomer concentration greater than 1 weight % (based on the total weight of the monomers, diluent, and catalyst system), preferably greater than 5 weight %, greater than 15 weight % in another embodiment. In yet another embodiment, the feed-stream will contain from 1 weight % to 50 weight % monomer concentration based on the total weight of monomer, diluent, and catalyst system (the monomer concentration may be limited in loop slurry operation to prevent pump cavitation).

In one embodiment of the invention, hydrogen is added to the reactor for molecular weight control. As is well known to those skilled in the art, increased concentrations of hydrogen relative to the concentration of monomer(s) in the reactor cause the production of polymer of lower number average and weight average molecular weights.

In one embodiment of the invention, a liquid process is employed, which comprises contacting olefin monomers with polymerization catalyst in an optional solvent and allowing the monomers to react for a sufficient time to produce the desired polymers. Hydrocarbon solvents suitable for the process include aliphatic and aromatic solvents. Alkanes, such as hexane, pentane, isopentane, and octane, are preferred.

Process Conditions

One embodiment of the invention incorporates the use of a slurry phase polymerization process, preferably as a continuous polymerization process. The slurry polymerization process is preferably carried out at pressures in the range of from about 1 to about 100 atmospheres, preferably in the range of from 1 to 50 atmospheres. Operating temperatures are generally in the range of from 0° C. to about 200° C., preferably from 50° C. to about 120° C. Preferably, the polymerization temperature is above room temperature (23° C.), preferably above 25° C., preferably above 27° C., preferably above 30° C., preferably above 50° C., preferably above 70° C.

In one embodiment of the slurry process, the monomers, catalyst(s), and initiator(s) are miscible in the diluent or diluent mixture, i.e., constitute a single phase, while the polymer precipitates from the diluent with good separation from the diluent. In one embodiment, a solvent or co-diluent is added to the reaction process. In a particular embodiment, an alkane having from 3 to 7 carbon atoms, preferably a branched alkane, is added. Preferred alkanes include isobutane and isohexane.

A preferred polymerization technique of the invention is referred to as a particle form polymerization, which is essentially a slurry process utilizing a supported catalyst wherein the temperature is kept below the temperature at which the polymer goes into solution. Such technique is well known in the art, and described in for instance U.S. Pat. No. 3,248,179, which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. Nos. 4,613,484 and 5,986,021, which are herein fully incorporated by reference. Such combinations of stirred slurry, loop slurry, or stirred and loop slurry reactors are useful for production of bimodal polymers.

In one embodiment, the reactor used in the slurry process of the invention is capable of producing greater than 2000 lbs of polymer per hour (907 kg/hr), more preferably greater than 5000 lbs/hr (2268 kg/hr), and most preferably greater than 10,000 lbs/hr (4540 kg/hr). In another embodiment the slurry reactor used in the process of the invention is capable of producing greater than 15,000 lbs of polymer per hour (6804 kg/hr), preferably greater than 25,000 lbs/hr (11,340 kg/hr) to about 100,000 lbs/hr (45,500 kg/hr).

In one embodiment, polymer granules and supported catalyst particles are present as solid particles in the slurry reactor, and the slurry diluent is a hydrofluorocarbon, one or more hydrocarbons, or mixtures thereof. In one embodiment, the concentration of solid particles in the slurry is equal to or greater than 10 volume percent. In another embodiment, the solid particles are present in the slurry at a concentration equal to or greater than 25 volume percent. In yet another embodiment, the solid particles are present in the slurry at a concentration less than or equal to 75 volume percent. In yet another embodiment, the solid particles are present in the slurry at concentrations ranging from 1 to 70 volume percent; from 5 to 70 volume percent; from 10 to 70 volume percent; from 15 to 70 volume percent; from 20 to 70 volume percent; from 25 to 70 volume percent; from 30 to 70 volume percent; or from 40 to 70 volume percent.

Reactors and Reactor Systems

One or more slurry reactors in series or in parallel may be used in this invention. Alternatively, one or more gas phase reactors my be operated either upstream or downstream of the one or more slurry reactors. Catalyst component(s) (and any activator employed) may be delivered as a solution or slurry, either separately to the reactor, activated in-line just prior to the reactor, or preactivated and pumped as an activated solution or slurry to the reactor. A preferred operation is two solutions activated in-line. For information on methods to introduce multiple catalysts into reactors, see U.S. Pat. No. 6,399,722 and WO 01/30861 A1. While these reference may emphasize gas phase reactors, the techniques described are equally applicable to other types of reactors, including continuous stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst component may also be added to both reactors, with one component being added to a first reactor and other components added to other reactors.

In one embodiment, a continuous flow stirred tank-type reactor is used. The reactor is generally fitted with an efficient agitation means, such as a turbo-mixer or impeller(s), an external cooling jacket and/or internal cooling tubes and/or coils, or other means of removing the heat of polymerization to maintain the desired reaction temperature, inlet means (such as inlet pipes) for monomers, diluents and catalysts (combined or separately), temperature sensing means, and an effluent overflow or outflow pipe which withdraws polymer, diluent and unreacted monomers among other things, to a holding drum or quench tank. Preferably, the reactor is purged of air and moisture. One skilled in the art will recognize proper assembly and operation. The reactors are preferably designed to deliver good mixing of the catalyst and monomers within the reactor, good turbulence across or within the heat transfer tubes or coils, and enough fluid flow throughout the reaction volume to avoid excessive polymer accumulation or separation from the diluent.

In another embodiment of the invention, a reactor capable of performing a continuous slurry process, such as disclosed in U.S. Pat. No. 5,417,930, herein incorporated by reference, is used. A reactor pump impeller is employed in the reactor and can be of the up-pumping variety or the down-pumping variety.

The order of contacting the monomer feed-stream, catalyst, initiator, and diluent may be variable. In one embodiment, the initiator and catalyst are pre-complexed by mixing together in the selected diluent for a prescribed amount of time ranging from 0.01 second to 10 hours, and then is injected into a continuous reactor through a catalyst nozzle or injection apparatus. In yet another embodiment, catalyst and the initiator are added to the reactor separately. In another embodiment, the initiator is blended with the feed monomers before injection to the reactor. Desirably, the monomer is not contacted with the catalyst, or the catalyst combined with the initiator before entering the reactor.

In another embodiment of the invention, the initiator and catalyst are allowed to pre-complex by mixing together in the selected diluent at temperatures between −40° C. and the freezing point temperature of the diluent, with a contact time between 0.01 seconds and several hours, and between 0.1 seconds and 5 minutes, preferably less than 3 minutes, preferably between 0.2 seconds and 1 minute before injection into the reactor.

In yet another embodiment of the invention, the initiator and catalyst are allowed to pre-complex by mixing together in the selected diluent at temperatures between −80° C. and 150° C., typically between −40° C. and the desired reaction temperature, typically between −40° C. and 120° C.

The overall residence time in the reactor can vary, depending upon, for example, catalyst activity and concentration, monomer concentration, feed injection rate, production rate, reaction temperature, and desired molecular weight. Residence time will generally be between about a few seconds and five hours, and typically between about 10 and 60 minutes. A variable influencing residence time is the monomer and diluent feed injection rates and the overall reactor volume.

According to another embodiment of the invention, the process can be carried out in a loop reactor or a stirred tank reactor. Withdrawal of polymer product from the reactor can be accomplished by concentrating the solids for intermittent withdrawal or by continuous withdrawal of a portion of the slurry. Intermittent withdrawal is typically driven by a difference between the density of the polymer product and the density of the diluent. In a particular embodiment, polymerization slurry is circulated within a loop reactor by multiple pumps. Typically in such an embodiment, the reactor volume is greater than 20,000 gallons (75.7 kiloliters).

The overall residence time in the reactor can vary, depending upon, for example, catalyst activity and concentration, monomer concentration, feed injection rate, production rate, reaction temperature, and desired molecular weight. Residence time will generally be between about a few seconds and five hours, and typically between about 10 and 60 minutes. A variable influencing residence time is the monomer and diluent feed injection rates and the overall reactor volume.

In one embodiment of the invention, the reactor is operated at a space time yield greater than 2.6 lbs/hr-gal (0.316 kg/hr-l). Alternatively, the reactor is operated at a space time yield greater than 3.0 lbs/hr-gal (0.360 kg/hr-l), alternatively greater than 3.3 lbs/hr-gal (0.395 kg/hr-l).

In another embodiment, polymerization slurry in the reactor has a volume percent solids greater than 50. Preferably, the volume percent solids in the polymerization slurry in the reactor is greater than 60, more preferably the volume percent solids in the polymerization slurry in the reactor is greater than 70. The volume percent solids in the reactor is measured by visually observing the solids level of a representative captive sample of the reaction mixture which was allowed to settle at saturation pressure in a sight glass. In this measurement method, the volume percent solids is determined by observing the height of the settled polymer particles in the sight glass and dividing this observed height by the height of the total captive sample of the reaction mixture, and wherein the cross sectional area of the sight glass containing the captive sample is the same as the cross sectional area of the vertical pipe of the pipe-loop reactor.

Product Recovery

Polymer product that leaves the reactor unit of the reaction system contains entrained material that should be separated from the polymer. Included in this polymer product are unreacted monomers and undesirable hydrocarbon by-products of the reaction process. Also included are any diluent and/or solvent materials that are not reactive to form desirable polymer, and are especially problematic with regard to removal and/or recovery.

A substantial portion (i.e., a majority) of the polymer product is separated from the non-polymer product by sending product effluent from the polymer reactor to a polymer recovery system. The polymer recovery system is operated by controlling a variety of parameters including temperature, pressure, vapor-liquid separation systems, and purge systems or vessels.

In one embodiment, the polymer recovery system incorporates the use of an inert gas to purge or scrub out undesirable entrained material from the polymer product. The inert gas is a composition that is substantially non-reactive with the polymer product, and can be used in sufficient quantity as a driving force to separate the non-polymer components from the polymer product. Examples of useful inert gases include air and nitrogen.

In a particular embodiment, polymer associated with entrained materials such as unreacted monomer, hydrocarbon by-product and diluent such as hydrofluorocarbon is recovered from a polymerization reaction process and sent to a polymer recovery system. Preferably, the polymer recovery system includes a purge system or vessel, more preferably a purge bin, and the polymer and associated entrained materials are sent to the purge system. The inert gas composition is then input into the purge system to purge or drive out the entrained materials, thereby forming a purge stream, which is recovered from the purge system.

Entrained, non-polymer product material that is separated and recovered as a purge stream from the polymer product is preferably further separated into component fractions or a plurality of streams and each fraction or stream stored, recycled or vented from the system as appropriate. It is preferred that diluent and unreacted monomer be separated and returned to the reactor. These streams can be separated and recovered as individual streams or as a combined stream. If in inert gas is used in the recovery system, it is preferred that the inert gas also be separated, preferably as an individual stream, and recovered for reuse in the polymer recovery system and/or in the reaction portion of the polymerization system.

In one embodiment, the effluent from the polymerization reactor is flashed in a first flash to vaporize from about 50% to about 100% of the liquid medium to produce concentrated polymer effluent and vaporized liquid. Flashing can be accomplished by reducing pressure or by heating. Preferably, the vapor obtained in the first flash is condensed, more preferably the vapor is condensed without compression, and most preferably is compressed by heat exchange. Preferably, the first flash is operated at from about 140 psia (965 kPa) to about 315 psia (2172 kPa).

In another embodiment, polymer solids are discharged from a first flash to a second flash through a seal chamber. The seal chamber preferably is of sufficient dimension such as to maintain a volume of polymer solids/slurry in the seal chamber sufficient to maintain a pressure seal.

In another embodiment, concentrated polymer effluent and vaporized liquid are continuously separated. In a preferred aspect, the concentrated polymer effluent slurry is flashed in a second flash to vaporize liquid.

In one embodiment of the invention, the polymerization effluent from the polymerization reactor is heated and then sent to a flash operation. Preferably, the polymerization effluent is heated to a temperature below the fusion temperature of the polymer. The quantity of heat supplied to the polymerization effluent is preferably at least equal to that quantity of heat which equals the heat of vaporization of the liquid medium which is to be flashed.

The polymer solids can be separated by any appropriate physical means as well. One non-limiting example is to separate the polymer solids from the diluent using a centrifuge apparatus.

Polymer Products

General Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, multimodal or bimodal high molecular weight polyethylenes, polypropylene and polypropylene copolymers.

Density

The polymers produced according to this invention can be produced at any density suitable for the appropriate end use. In one embodiment, there can be produced ethylene based polymers having a density in the range of from 0.86 g/cc to 0.97 g/cc. For some applications, a density in the range of from 0.88 g/cc to 0.920 g/cc is preferred while in other applications, such as pipe, film and blow molding, a density in the range of from 0.930 g/cc to 0.965 g/cc is preferred. For low density polymers, such as for film applications, a density of 0.910 g/cc to 0.940 g/cc is preferred. Density is measured in accordance with ASTM method 1505.

Molecular Weight and Molecular Weight Distribution

The polymers produced by the process of the invention can be produced in a wide variety of molecular weights and molecular weight distributions. Molecular weights (weight average molecular weight (Mw) and number average molecular weight (Mn)) are preferably determined using a Waters 150 Size Exclusion Chromatograph (SEC) equipped with a differential refractive index detector (DRI), an online low angle light scattering (LALLS) detector and a viscometer (VIS). The details of the detector calibrations are described by T. Sun, P. Brant, R. R. Chance, and W. W. Graessley, *Macromolecules*, Volume 34, Number 19, 6812-6820, (2001), and are incorporated herein by reference.

The polymers produced by the process of the invention can be used in a wide variety of products and end-use applications. Preferred polymers produced herein may have an $M_n$ (number-average molecular weight) value from 300 to 1,000,000, or between from 700 to 300,000. For low weight molecular weight applications, such as those copolymers useful in lubricating and fuel oil compositions, an $M_n$ of 300 to 20,000 is contemplated, or less than or equal to 10,000.

In one embodiment, the polymer produced has a weight average molecular weight (Mw) of 40,000 or more, preferably 60,000 or more, preferably 100,000 or more, preferably 120,000 or more, preferably 150,000 or more. For LLDPE cast grade films a weight average molecular weight of 40,000 or more is preferred while a weight average molecular weight of 60,000 or more is preferred for blown film grades.

In an embodiment of the invention, the polymers produced have a molecular weight distribution (MWD), which is defined as a ratio of weight average molecular weight to number average molecular weight (MWD=$M_w/M_n$), of greater than 1.5 to less than about 70. In some embodiments, the polymer has a $M_w/M_n$ of from about 2 to 60, while in other embodiments the polymer produced has a $M_w/M_n$ of from about 5 to 50. Higher MWD's are usually the result of mixtures of bulky ligand or mixtures of bulky ligand and other catalyst systems. In one embodiment, the polymer of the invention has a narrow molecular weight distribution and a broad composition distribution, and vice-versa, such as those polymers described in U.S. Pat. No. 5,798,427, incorporated herein by reference.

In another embodiment, the polyolefin produced has at least two species of molecular weights. Preferably, both species are present at greater than 20 weight %, based upon deconvolution of GPC molecular weight distribution curve.

Composition Distribution Breadth Index

The polymers of the invention may have a narrow or broad composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference. In some embodiments the polymer produced may have a CDBI of 80% or more or may have a CDBI of 50% or less.

In one embodiment, the polymers of the invention have CDBI's generally in the range of greater than 50% to 100%, preferably 99%, preferably in the range of 55% to 85%, and more preferably 60% to 80%, even more preferably greater than 60%, still even more preferably greater than 65%. In another embodiment, polymers produced using this invention have a CDBI less than 50%, more preferably less than 40%, and most preferably less than 30%.

The CDBI is defined as the weight percent of the ethylene interpolymer molecules having a comonomer content within 50 percent of the median total molar comonomer content. For instance if the median total molar comonomer content of a certain group of ethylene interpolymers is found to be 4 mole percent, the CDBI of that group of interpolymers would be the weight percent of ethylene interpolymers having a molar comonomer concentration from 2 to 6 mole percent. If 55 weight % of the ethylene interpolymers had a molar comonomer content in the 2 to 6 mole percent range, the CDBI would be 55%. The CDBI of linear homopolymer polyethylene, which does not contain a comonomer, is defined to be 100%. The CDBI of a copolymer is readily calculated by data obtained from techniques known in the art, such as, for example, temperature rising elution fractionation as described, for example, in U.S. Pat. No. 5,008,204 or in Wild et al., I" Poly. Sci, Poly. 2hys. Ed., vol. 20, p. 441 (1982), both of which are hereby fully incorporated herein by reference.

Melt Index

The polymers produced by the process of the invention can be produced according to a desired or predetermined melt index, depending upon desired end use. In one embodiment, the polymers have a melt index (MI) or ($I_2$), as measured by ASTM-D-1238-E, in the range from 0.01 dg/min to 1000 dg/min, more preferably from about 0.01 dg/min to about 100 dg/min, even more preferably from about 0.01 dg/min to about 50 dg/min, and most preferably from about 0.1 dg/min to about 10 dg/min.

In another embodiment of the invention, the polymers have a melt index ratio ($I_{21}/I_2$) ($I_{21}$ is measured by ASTM-D-1238-F) of from 10 to less than 25, more preferably from about 15 to less than 25.

The polymers of the invention in another embodiment have a melt index ratio of from preferably greater than 25, more preferably greater than 30, even more preferably greater that 40, still even more preferably greater than 50 and most preferably greater than 65. In another embodiment, the polymer of the invention has a narrow molecular weight distribution and a broad composition distribution or vice-versa. Examples include those polymers described in U.S. Pat. No. 5,798,427, the description of which is incorporated herein by reference.

These polymer products are also characterized as having at least 10 ppm of residual fluorine present, preferably between 10 and 10,000 ppm of fluorine present, preferably between 10 and 1000 ppm.

Applications

Polymers produced by the process of the invention and blends thereof are useful in producing a wide variety of articles. For example, the polymers are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

EXAMPLES

Test Methods

The melt index (MI) was measured in accordance with ASTM D 1238 (190° C., 2.16 kg), the melt index ratio (MIR) was determined from the ratio of the MI measurements at (190° C., 21.6 kg) to that at (190° C., 2.16 kg). Measurements were started after about 6½ minutes in the barrel.

Density

Density in g/cc is determined in accordance with ASTM 1505 and ASTM D-1928, procedure C, plaque preparation. A plaque is made and conditioned for one hour at 100° C. to approach equilibrium crystallinity, measurement for density is then made in a density gradient column.

Mw and Mn were measured by two GPC (Gel Permeation Chromotography) methods:

GPC Method "A"—High Temperature Gel Permeation Chromatography

This method uses a Waters 150C ALC/GPC gel permeation chromatograph equipped with a Waters differential refractometer that measures the difference between the refractive index of the solvent and that of the solvent containing the fractionated polymer. The system was used at 145° C. with 1,2,4-trichlorobenzene (TCB) as the mobile phase that is stabilized with ~300 ppm of Santonox. The flow rate used was 1 mL/min. Three Shodex (Showa Denko America, Inc) mixed bed columns AT_80M/S were used. The data is acquired and analyzed using Waters Corporation Millenium version 2.15.01 (or equivalent) software.

Polyethylene (PE) molecular weight values are calculated based on a 3 Region "broad calibration" approach: 1) The low molecular weight region (250-850 g/mole) is calibrated by a series of n-alkanes. 2) The column calibration in the middle molecular weight region (5,000-350,000 g/mole) is based on narrow polystyrene standards for which polyethylene 'equivalent' peak molecular weights have been assigned using NBS 1475, a linear PE standard from the National Institute of Standards and Testing (NIST) according to the procedure discussed in "*National Bureau of Standards Journal of Research, Section A. Physics and Chemistry*, Vol. 76A, No. 2, March-April 1972, pg 140", which is incorporate herein by reference. 3) Polystyrene standards are used to calibrate for MW>350,000 using the "universal calibration" method and the following Mark-Houwink coefficients:

|  | k (dL/g) | a |
|---|---|---|
| PS | $1.75 \times 10^{-4}$ | 0.67 |
| PE | $5.17 \times 10^{-4}$ | 0.70 |

A calibration curve (logMp vs. retention volume) is generated by recording the retention volume at the peak in the DRI signal for each standard. The calibrations in each region are combined to form a single calibration curve of Log(MP) vs retention volume. A third order fit is used to fit the data, and an extrapolation point is determined to extend the calibration curve.

GPC Method "B"—Gel Permeation Chromatography—DRI Only

This method uses a Waters 150C C GPC gel permeation chromatograph equipped with a Waters differential refractometer that measures the difference between the refractive index of the solvent and that of the solvent containing the fractionated polymer. The system was used at 145° C. with 1,2,4-Trichlorobenzene (TCB) as the mobile phase that was stabilized with ~250 ppm of butylated hydroxy toluene (BHT). The flow rate used was 0.5 mL/min. Three (Polymer Laboratories) PLgel Mixed-B columns were used. This technique is discussed in "*Macromolecules*, Vol. 34, No. 19, pp. 6812-6820" which is incorporated herein by reference.

The separation efficiency of the column set was calibrated using a series of narrow MWD polystyrene standards, which reflects the expected MW range for samples and the exclusion limits of the column set. At least 10 individual polystyrene standards, ranging from Mp ~580 to 10,000,000, were used to generate the calibration curve. The polystyrene standards are obtained from Polymer Laboratories (Amherst, Mass.) or an equivalent source. To assure internal consistency, the flow rate is corrected for each calibrant run to give a common peak position for the flow rate marker (taken to be the positive inject peak) before determining the retention volume for each polystyrene standard. The flow marker peak position thus assigned was also used to correct the flow rate when analyzing samples; therefore, it is an essential part of the calibration procedure. A calibration curve (logMp vs. retention volume) is generated by recording the retention volume at the peak in the DRI signal for each PS standard, and fitting this data set to a $2_{nd}$-order polynomial. Polystyrene standards were graphed using Viscotec 3.0 software. Samples were analyzed using WaveMetrics, Inc. IGOR Pro and Viscotec 3.0 software using updated calibration constants.

A preferred procedure used in the present application for Differential Scanning Calorimetry (DSC) is described as follows. Peak melting point (Tm), peak crystallization temperature (Tc), heat of fusion and crystallinity were determined using the following procedure according to ASTM E 794-85. Differential scanning calorimetric (DSC) data was obtained using a TA Instruments model 2920 machine. Samples weighing approximately 7-10 mg were sealed in aluminum sample pans. The DSC data was recorded by first cooling the sample to −50° C. and then gradually heating it to 200° C. at a rate of 10° C./minute, called first melt. The sample was kept at about 200° C. for 5 minutes before a second cooling-heating cycle was applied. During the second cycle, the sample was cooled from 200° C. to −50° C. at a rate of 10° C./minute, called second cool, and then kept at −50° C. for 5 minutes and heated to 200° C. at a rate of 10° C./minute, called second melt. All the thermal events in both the first and second cycle were recorded. The melting temperature ($T_m$) was the peak temperature of the melting curve and the crystallization temperature ($T_c$) was the peak temperature of the cooling peak. Tm, Tc and heat of fusion were obtained from the thermal events in the second melt and second cool unless otherwise noted.

Crystallinity: Weight percent degree of crystallinity is calculated from the measured density of the sample and known densities of crystalline and amorphous polyethylene according to the equation: $100 \times (1/\rho - 1/\rho_a)/(1/\rho_c - 1/\rho_a)$, as described in the *Handbook of Polyethylene*, published by Marcel Dekker, Inc. In this calculation, ρ is the measured sample density, $\rho_c$ is the unit cell crystalline density, and $\rho_a$ is the amorphous density. The value of $\rho_c$ is taken to be 1.000 g/cm³, while the value of $\rho_a$ is commonly accepted as 0.853 g/cm³.

Experimental—Polymerizations (Tables 1-10)

The following experimental examples demonstrate that the slurry phase polymerization of ethylene with supported Metallocene catalysts, including unbridged, bridged, and mono Cp structures, is enabled with diluents consisting of varying levels of heteroatom (i.e. not pertaining to C or H) incorporation. These diluents can possess a range of boiling points depending on their composition and molecular weight.

Diluents

For the examples below, the heteroatomic nature of the diluent is defined as:

atoms per molecule excluding C and H/total # of atoms.

Thus, for a conventional hydrocarbon diluent, this value is equal to zero.

TABLE 1

Examples Of Conventional And Heteroatom Containing Diluents

| Diluent | Heteroatomic Nature | Boiling Point (C.) |
|---|---|---|
| n-hexane | 0.0 | 69 |
| Isobutane | 0.0 | −12 |
| Perfluorohexane | 0.7 | 59 |
| Perfluorobutane | 0.7 | −2 |
| Perfluorocyclobutane | 0.7 | −5.8 |
| 1,1,1,2,3,3,3 heptafluoropropane (HFC-227ea) | 0.64 | −15.2 |
| 1,1,1,3,3,3 hexafluoropropane (HFC-236fa) | 0.55 | −1 |
| 1,1,1,2,3,3 hexafluoropropane (HFC-236ea) | 0.55 | 6.5 |
| 1,1,1,3,3 hexafluoropropane (HFC-245fa) | 0.45 | 15 |
| 2-Fluoropropane (HFC-281) | 0.09 | −2.5 |

Pressure

In the following slurry phase experiments pressure is reported in atmospheres and pounds per square inch. The conversion factors from English to S.I. Units are; 1 psi equals 6.894757 kPa and 1 atm equals 101.325 kPa.

Feed and Co-Monomer

Polymerization grade ethylene was used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company.

98+% 1-hexene was obtained from Alfa-Aesar and further purified by filtration through basic alumina (Aldrich Chemical Company, Brockman Basic 1) into a vessel containing activated 3A molecular sieve.

Catalysts

Catalyst D: A supported unbridged metallocene catalyst was prepared according to the following procedure. In a dry box, a 50 mL bottle was charged with 78.1 mg bis(1,3-methyl-n-butyl cyclopentadienyl) zirconium dichloride [(1-nBu-3Me-Cp)$_2$ZrCl$_2$], 16 mL of toluene and 5.12 mL of 30 weight % methylalumoxane (MAO). After stirring light yellow solution at 25° C. for 55 minutes, the mixture was transferred into a 50 mL cell stir charged with 4.000 g of Davison 955 SiO$_2$ dehydrated at 600° C. The brownish yellow mixture was stirred at 25° C. for 1 hr. The slurry was filtered through a 60 mL, course fritted filter and the cell stir was washed with 3 mL of toluene. The yellow catalyst was dried in vacuo for 4 hrs. A yield of 5.465 grams was obtained.

Catalyst E: A supported bridged metallocene catalyst was prepared according to the following procedure. In a dry box, a 125 mL bottle was charged with 82.5 mg of dimethylsilylbis (tetrahydroindenyl) zirconium dichloride [rac-Me$_2$Si (H$_4$Ind)$_2$ ZrCl$_2$], 20 mL of toluene and 5.12 mL of 30 weight % methylalumoxane (MAO). After stirring at 25° C. for 1 hr, the mixture was transferred into a 50 mL flask charged with 4.000 g of Davison 955 SiO$_2$ dehydrated at 600° C. The mixture was stirred at 25° C. for 1 hr. The slurry was filtered and the solid catalyst was washed with 10 mL of toluene. The yellow catalyst was dried in vacuo for 3 hrs. A yield of 5.48 grams was obtained.

Catalyst F: A supported Mono Cp metallocene catalyst was prepared according to the following procedure. In a drybox, 59.1 mg of dimethylsilyl(tetramethylcyclopentadienyl)(t-butylamido)titanium dimethyl [Me$_2$Si(Me$_4$Cp)(NtBu)TiMe$_2$] was dissolved in 16 mL of toluene in a 50 mL roundbottom flask. To this yellow solution, 5.13 mL of a 30 weight % MAO in toluene solution was added. The resulting orange solution was stirred for approximately one hour. This solution was subsequently added to 4.0 g of Davison 955 SiO$_2$ dehydrated at 600° C. in a 50 mL stir cell. Resulting brownish-orange mixture was stirred for one hour and then filtered through a 30 mL course fritted funnel. Stir cell was rinsed with approximately 3 mL of toluene to recover remaining material. Recovered light yellow solid was dried in vacuo for 3 hours. A yield of 5.472 grams was obtained.

Scavenger/Co-Catalyst

Tri n-octyl aluminum (TNOAL) was obtained from Akzo Chemicals, Inc. and used without further purification.

Diluents 1,1,1,3,3,3 hexafluoropropane (HFC-236fa) was obtained from DuPont, 2H-heptafluoropropane (HFC-227ea), 2-fluoropropane (HFC-281ea), perfluorobutane, and perfluorohexane were obtained from SynQuest Laboratories, Inc. Polymerization grade isobutane was also used.

All above diluents were purified by passing through a series of purification materials in the order of Molecular Sieve 3A (obtained from Aldrich Chemical Company), Molecular Sieve 13X (obtained from Aldrich Chemical Company), and Selexsorb CD (obtained from Aldrich Chemical Company) prior to being used as a polymerization medium.

Polymerization grade hexane was used and further purified by passing it through a series of columns: 500 cc Oxyclear cylinder from Labelear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company.

Reactor Description and Preparation

Polymerizations were conducted in an inert atmosphere (N$_2$) drybox using autoclaves equipped with an external heater for temperature control, glass inserts (internal volume of reactor=22.5 mL), septum inlets, regulated supply of nitrogen, hydrogen/nitrogen mixture, and ethylene, and equipped with disposable PEEK mechanical stirrers (400 RPM). The autoclaves were prepared by purging with dry nitrogen at 110° C. or 115° C. for 5 hours and then at 25° C. for 5 hours.

Ethylene/1-Hexene Copolymerization

The reactor was prepared as described above, and then purged with ethylene. The reactors were heated to 40° C. and ethylene was first charged to the reactor.

Diluents with boiling points below room temperature were pressurized to approximately 80 psig (552 kPag) at ambient temperature to maintain them in the liquid phase and were subsequently added to the reactor via syringe. Higher boiling point diluents were added at ambient temperature and pressure via syringe. The amount of each diluent added at 40° C. was calculated to give approximately the same volumetric amount for all diluents (~4 mL) at the polymerization temperature to be studied. Therefore, an amount in excess of 4 mL was added to compensate for evaporative losses due to vapor pressure generation in the headspace above the diluent.

A solution of 1-hexene and scavenger/co-catalyst at room temperature and pressure was next added to the reactors via syringe. The reactors were then brought to process temperature (85° C.) while stirring at 400 RPM. Once at process temperature, ethylene delivery pressure for polymerization was set to the pressure generated by the components (ethylene, hydrogen, diluent, co-monomer, scavenger/co-catalyst) in the reactor. Reaction pressures for each test are included in Tables 3, 6, and 9.

Supported catalyst was stirred in toluene at ambient temperature and pressure and added to the reactors (at process temperature and pressure) via syringe as a slurry to initiate polymerization. Amounts of all reagents, diluents, catalysts and co-catalysts are given in Tables 2, 5, and 8.

In the nature that solutions are added via syringe, a hexanes solution is also injected via the same syringe following their addition to insure that minimal solution is remaining in the syringe. This procedure is applied after the addition of the 1-hexene/scavenger/co-catalyst solution as well as the catalyst slurry. Thus, in each case, the diluent mixture consists of approximately 15 volume percent hexane as well.

Ethylene was allowed to enter (through the use of computer controlled solenoid valves) the autoclaves during polymerization to maintain reactor gauge pressure (+/−2 psig [13.8 kPa]). Reactor temperature was monitored and typically maintained within +/−1° C. Polymerizations were halted by addition of approximately 400 psig (2758 kPa) O$_2$/Ar (5 mole % O$_2$) gas mixture to the autoclaves for approximately 30 seconds. The polymerizations were quenched after a predetermined cumulative amount of ethylene had been added or for a maximum of 45 minutes polymerization time. The final quench time for each run is listed in Tables 4, 7, and 10. The reactors were cooled and vented. The polymer was isolated after the remaining reaction components were removed in-vacuo. Yields reported include total weight of polymer and residual catalyst. Catalyst productivity is reported as grams of polymer per gram of catalyst per hour of reaction time (g/g·hr). Yields and catalyst productivity are listed in Tables 4, 7, and 10 for all experiments at each condition.

Three sets of tests are included below. Tables 2-4 show the conditions and results of polymerizing ethylene and optionally comonomers in the slurry phase in a variety of diluents with a supported unbridged metallocene catalyst. Tables 5-7 show the conditions and results of polymerizing ethylene in the slurry phase with a supported bridged metallocene catalyst. Tables 8-10 show the conditions and results of polymerizing ethylene in the slurry phase with a supported mono Cp metallocene catalyst. Each diluent enables the polymerization of ethylene and optionally comonomers in the slurry phase on the supported metallocene catalyst.

TABLE 2

Supported unbridged metallocene polyethylene polymerization, amounts charged to reactors for varying diluents

| Example | Diluent | Amt (mL) | C6= (µL) | TNOAl (µmol) | Catalyst D (µg) |
|---|---|---|---|---|---|
| A | Isobutane | 4.8 | 50 | 4 | 300 |
| B | 1,1,1,3,3,3 hexafluoropropane | 4.75 | 50 | 20 | 300 |

TABLE 2-continued

Supported unbridged metallocene polyethylene polymerization, amounts charged to reactors for varying diluents

| Example | Diluent | Amt (mL) | C6= (μL) | TNOAl (μmol) | Catalyst D (μg) |
|---|---|---|---|---|---|
| | (HFC-236fa) | | | | |
| C | Perfluorobutane | 5.05 | 50 | 4 | 300 |
| D | 2-Fluoropropane | 4.81 | 50 | 4 | 300 |
| E | 1,1,1,2,3,3,3 heptafluoropropane (HFC-227ea) | 5.5 | 50 | 4 | 300 |
| F | Perfluorohexane | 4.25 | 50 | 4 | 300 |

TABLE 3

Reaction Conditions for examples A-F

| Example | Temperature (C.) | Total Pressure (psig/kPa) |
|---|---|---|
| A | 85 | 295/2034 |
| B | 85 | 285/1965 |
| C | 85 | 275/1896 |
| D | 85 | 305/2103 |
| E | 85 | 400/2758 |
| F | 85 | 300/2068 |

TABLE 4

Results of polymerization for examples A-G

| Example | Experiment # | Yield (g) | Quench time (s) | Productivity (g/g h) |
|---|---|---|---|---|
| A | 1 | 0.0697 | 1594.2 | 524.6 |
| | 2 | 0.0648 | 1021.3 | 761.3 |
| | 3 | 0.0631 | 1054.8 | 717.8 |
| | 4 | 0.0635 | 1015.2 | 750.5 |
| B | 1 | 0.0567 | 2700.9 | 250.9 |
| | 2 | 0.0617 | 2700.8 | 273.0 |
| | 3 | 0.0719 | 2701.3 | 318.1 |
| | 4 | 0.0502 | 2701.3 | 222.1 |
| C | 1 | 0.0344 | 2701.3 | 152.2 |
| | 2 | 0.0278 | 2701.5 | 123.0 |
| | 3 | 0.0256 | 2700.3 | 113.3 |
| | 4 | 0.0159 | 2700.7 | 70.3 |
| D | 1 | 0.0068 | 2700.4 | 30.1 |
| | 2 | 0.0075 | 2700.3 | 33.2 |
| | 3 | 0.0076 | 2700.5 | 33.6 |
| | 4 | 0.0058 | 2700.3 | 25.6 |
| E | 1 | 0.008 | 2700.6 | 35.54 |
| | 2 | 0.006 | 2700.6 | 26.6 |
| | 3 | 0.007 | 2701.5 | 31.0 |
| F | 1 | 0.088 | 771.5 | 1368.7 |
| | 2 | 0.089 | 741.1 | 1441.1 |
| | 3 | 0.081 | 725.8 | 1339.2 |

TABLE 5

Supported bridged metallocene polyethylene polymerization, amounts charged to reactors for varying diluents

| Example | Diluent | Amt (mL) | C6= (μL) | TNOAL (μmol) | Catalyst E (μg) |
|---|---|---|---|---|---|
| G | Isobutane | 4.8 | 300 | 3 | 300 |
| H | 1,1,1,2,3,3,3 heptafluoropropane (HFC-227ea) | 5.45 | 300 | 10 | 300 |
| I | Perfluorohexane | 4.25 | 50 | 4 | 300 |

TABLE 6

Reaction Conditions for examples G-I

| Example | Temperature (C.) | Total Pressure (psig/kPa) |
|---|---|---|
| G | 85 | 300/2068 |
| H | 85 | 400/2758 |
| I | 85 | 300/2068 |

TABLE 7

Results of polymerization for examples G-I

| Example | Experiment # | Yield (g) | Quench time (s) | Productivity (g/g h) |
|---|---|---|---|---|
| G | 1 | 0.0757 | 809.5 | 1122.1 |
| | 2 | 0.0462 | 505.2 | 1097.3 |
| | 3 | 0.0473 | 553.8 | 1024.8 |
| | 4 | 0.0383 | 490.4 | 937.1 |
| H | 1 | 0.015 | 2701.4 | 66.6 |
| | 2 | 0.008 | 2700.8 | 35.5 |
| | 3 | 0.006 | 2700.3 | 26.6 |
| | 4 | 0.007 | 2701.4 | 31.0 |
| I | 1 | 0.09 | 419 | 2577.5 |
| | 2 | 0.085 | 423.4 | 2409.0 |
| | 3 | 0.084 | 389.4 | 2588.5 |
| | 4 | 0.086 | 434.9 | 2372.9 |

The results illustrate that productivity for ethylene polymerization on supported unbridged metallocene catalysts is enabled for a slurry process in a variety of diluents with heteroatomic character in addition to the conventional diluent of isobutane.

The results illustrate that productivity for ethylene and optionally comonomers polymerization on supported bridged metallocene catalysts is enabled for a slurry process in diluents with heteroatomic character in addition to the conventional diluent of isobutane.

TABLE 8

Supported mono Cp metallocene polyethylene polymerization, amounts charged to reactors for varying diluents

| Example | Diluent | Amt (mL) | C6= (μL) | TEAL (μmol) | Catalyst F (μg) |
|---|---|---|---|---|---|
| J | Isobutane | 4.8 | 300 | 3 | 300 |
| K | 1,1,1,2,3,3,3 heptafluoropropane (HFC-227ea) | 5.45 | 300 | 10 | 300 |
| L | Perfluorohexane | 4.25 | 50 | 4 | 300 |

TABLE 9

Reaction Conditions for examples J-L

| Example | Temperature (C.) | Total Pressure (psig/kPa) |
|---|---|---|
| J | 85 | 300/2068 |
| K | 85 | 400/2758 |
| L | 85 | 300/2068 |

TABLE 10

Results of polymerization for examples J-L

| Example | Experiment # | Yield (g) | Quench time (s) | Productivity (g/g h) |
|---|---|---|---|---|
| J | 1 | 0.0759 | 2336.4 | 389.8 |
|   | 2 | 0.0698 | 2287.5 | 366.1 |
|   | 3 | 0.0747 | 2277.5 | 393.5 |
|   | 4 | 0.0728 | 2198.2 | 397.4 |
| K | 1 | 0.007 | 2700.7 | 31.1 |
|   | 2 | 0.003 | 2700.3 | 13.3 |
|   | 3 | 0.004 | 2700.1 | 17.7 |
|   | 4 | 0.004 | 2700.1 | 17.7 |
| L | 1 | 0.062 | 1003.5 | 741.4 |
|   | 2 | 0.057 | 912.3 | 749.7 |
|   | 3 | 0.053 | 837.1 | 759.7 |
|   | 4 | 0.065 | 1142.0 | 682.9 |

The results illustrate that productivity for ethylene and optionally comonomers polymerization on supported mono Cp metallocene catalysts is enabled for a slurry process in diluents with heteroatomic character in addition to the conventional diluent of isobutane Experimental—Polymerizations (Table 11)

Starting Materials

Catalyst A: Into a 2 gallon (7.57 liters) reactor was charged first with 2.0 liters of toluene then, 1060 g of 30 weight % methylalumoxane solution in toluene (available from Albermarle, Baton Rouge, La.), followed by 23.1 g of bis(1,3-methyl-n-butyl cyclopentadienyl) zirconium dichloride as a 10% solution in toluene. The mixture was stirred for 60 minutes at room temperature after which 850 g of silica (Davison 948 dehydrated at 600° C. available from W.R. Grace, Davison Chemical Division, Baltimore, Md.) was added to the liquid with slow agitation. Stirring speed was increased for approximately 10 minutes to insure dispersion of the silica into the liquid and then appropriate amount of toluene was added to make up a slurry of liquid to solid having a consistency of 4 cc/g of silica. Mixing was continued for 15 minutes at 120 rpm after which 6 g of Kemamine AS-990 (available Witco Corporation, Memphis, Tenn.) was dissolved in 100 cc of toluene and was added and stirred for 15 minutes. Drying was then initiated by vacuum and some nitrogen purge at 175° F. (79.4° C.). When the polymerization catalyst comprising the carrier, silica, appeared to be free flowing, it was cooled down and discharged into a nitrogen purged vessel. An approximate yield of 1 Kg of dry polymerization catalyst was obtained due to some loses due to drying.

Catalyst B: The catalyst used in these experiments was a bulky ligand metallocene-type catalyst. The bulky ligand metallocene-type catalyst compound used in this Comparative Example 1 is a dimethylsilylbis (tetrahydroindenyl) zirconium dichloride ($Me_2Si(H_4Ind)_2ZrCl_2$) available from Albemarle Corporation, Baton Rouge, La. The ($Me_2Si(H_4Ind)_2ZrCl_2$) catalyst compound was combined with a 30 weight percent methylaluminoxane (MAO) in toluene (available from Albemarle, Baton Rouge, La.) and was supported on Crosfield ES-70 grade silica dehydrated at 600° C. having approximately 1.0 weight percent water Loss on Ignition (LOI). LOI is measured by determining the weight loss of the support material which has been heated and held a temperature of about 1000° C. for about 22 hours. The Crosfield ES-70 grade silica has an average particle size of 40 microns and is available from Crosfield Limited, Warrington, England.

1-hexene: The 1-hexene comonomer was obtained from Alfa Aesar, their stock number 31648, and was purified prior to use by passing it through a column of activated aluminum oxide, obtained from Aldrich Chemical Company (their part Number 19,944-3). Before use, the activated aluminum oxide was placed in a vacuum oven at 200° C., and vacuum was applied at least over night.

1-Butene: The 1-butene was obtained from Matheson Tri-State and was purified prior to use by passing it through a series of purification columns before it was introduced into the reactor. The columns were (sequentially): 4A molecular sieves, Selexsorb CD alumina, Selexsorb COS alumina, and Oxyclear column. The 4A mole sieves were 8-12 mesh and were obtained from Aldrich Chemical Company (their part number 20,860-4). The Selexsorb CD alumina (7×14 mesh, no part number) and Selexsorb COS (7×14 mesh, no part number) were manufactured by Alcoa Chemical company. The Oxyclear column was obtained from Lab Clear, 508 29th Avenue, Oakland Calif. 94601, part number RGP-R1-1000.

TEAL: The triethyl aluminum (TEAL) was obtained as a 1M solution in hexane from Aldrich Chemical Company, part number 25,266-2, and was used as received.

Isobutane: The isobutane was passed through a series of purification columns on the way to the reactor. The columns were (sequentially): 13X molecular sieves, Selexsorb CD alumina, Selexsorb COS alumina, and Oxyclear column. The 13X mole sieves were 8-12 mesh and were obtained from Aldrich Chemical Company (their part number 20,864-7). The Selexsorb CD alumina (7×14 mesh, no part number) and Selexsorb COS (7×14 mesh, no part number) were manufactured by Alcoa Chemical company. The Oxyclear column was obtained from Lab Clear, 508 29th Avenue, Oakland Calif. 94601, part number RGP-R1-1000.

Ethylene: The ethylene was a polymerization grade and was passed through a series of purification columns on the way to the reactor. The columns were (sequentially): 3A molecular sieves, Selexsorb CD alumina, Selexsorb COS alumina, and Oxyclear column. The 3A mole sieves were 8-12 mesh and were obtained from Aldrich Chemical Company (their part number 20,858-2). The Selexsorb CD alumina (7×14 mesh, no part number) and Selexsorb COS (7×14 mesh, no part number) were manufactured by Alcoa Chemical company. The Oxyclear column was obtained from Lab Clear, 508 29th Avenue, Oakland Calif. 94601, part number RGP-R1-1000.

HFC-236fa: (1,1,2,3,3,3,-hexafluoropropane) The HFC-236fa was obtained from DuPont, marketed as SUVA 236fa. The HFC-236fa was passed through purification columns containing 3A mole sieves, 13X mole sieves, and Selexsorb CD alumina. The 13X mole sieves were 8-12 mesh and were obtained from Aldrich Chemical Company (their part number 20,864-7). The other packing materials were the same as those for the ethylene purification (described above).

HFC-245fa: (1,1,1,3,3-pentafluoropropane) The HFC-245fa was obtained from Honeywell, as marketed under their trade name Enovate 3000. The HFC-236fa was passed through purification columns containing 3A mole sieves, 13X mole sieves, and Selexsorb CD alumina, and Oxyclear. The 13X mole sieves were 8-12 mesh and were obtained from Aldrich Chemical Company (their part number 20,864-7). The other packing materials were the same as those for the ethylene purification (described above).

During the reaction, the system temperature was maintained at 85° C. by means of an external steam and cooling water control system, and the pressure was maintained at 350 psig (2413 kPa) by means of an ethylene make-up system. (As the ethylene was consumed by reaction, additional ethylene was added to the system automatically to hold the reactor pressure at 350 psig. (2413 kPa)) The reaction was maintained for 45 minutes, at which time the reactor was vented to terminate the reaction. The reactor was then opened, and the polymer product collected for analysis. Depending on the experiment, the polymer product consisted of granular resin and/or foulant material. The granular material was poured from the reactor, and the foulant material was scraped off of the reactor walls and slurry agitator. The granular material and foulant were individually weighed and analyzed for weight percent fouling, productivity (PD), density, melt index ($MI_2$ and $MI_{21}$), melt flow ratio ($MFR=MI_{21}/MI_2$), and polydispersity index (PDI=weight average molecular weight divided by number average molecular weight). Results are given in Table 11.

TABLE 11

| Ex.# | Diluent | Hexene (cc) | Catalyst | Cat. (mg) | TEAL (mmol) | Wt. % fouling | PD (g/g/hr) | Density (g/cc) | MI2 | MI21 | MFR | PDI |
|---|---|---|---|---|---|---|---|---|---|---|---|---|
| 1 | HFC-245fa | 60 | A | 98 | 0.50 | 0 | 978 | 0.9157 | 0.504 | 10.21 | 20.3 | 2.96$^B$ |
| 2 | HFC-245fa | 60 | A | 102 | 1.00 | 0 | 839 | 0.9182 | 0.641 | 12.44 | 19.4 | 2.81$^B$ |
| 3 | HFC-236fa | 60 | A | 99 | 0.50 | 0 | 937 | 0.9127 | 0.756 | 11.71 | 15.5 | 2.74$^A$ |
| 4 | Isobutane | 60 | A | 107 | 0.50 | 0 | 1615 | 0.9208 | 0.344 | 5.28 | 15.3 | 2.29$^A$ |
| 5 | Isobutane | 60 | A | 108 | 0.50 | 0 | 2067 | 0.9182 | 0.32 | 5 | 15.6 | 3.09$^B$ |
| 6 | Isobutane | 60 | A | 89 | 0.50 | 0 | 1477 | 0.9184 | 0.423 | 6.99 | 16.5 | 3.08$^B$ |
| 7 | Isobutane | 60 | A | 97 | 0.50 | 100 | 356 | — | — | — | — | 3.16$^B$ |
| 8 | Isobutane | 90 | A | 113 | 0.50 | 8.6 | 1411 | 0.9158 | 0.383 | 6.56 | 17.1 | 2.94$^B$ |
| 9 | HFC-236fa | 120 | A | 113 | 0.50 | 0 | 662 | 0.9023 | 0.665 | 12.57 | 18.9 | 14.15 |
| 10 | Isobutane | 120 | A | 107 | 0.50 | 0 | 2125 | 0.912 | 0.265 | 4.13 | 15.6 | 2.43$^A$ |
| 11 | Isobutane | 130 | A | 92 | 0.50 | 0 | 2723 | 0.9128 | 0.221 | 3.43 | 15.5 | 3.16$^B$ |
| 12 | Isobutane | 150 | A | 101 | 0.50 | 100 | 2526 | 0.912 | 0.198 | 3.36 | 17.0 | 3.10$^B$ |
| 13 | HFC-236fa | 180 | A | 101 | 0.50 | 0 | 652 | 0.8952 | 1.05 | 21.4 | 20.4 | 5.87$^A$ |
| 14 | Isobutane | 180 | A | 97 | 0.50 | 100 | 2145 | 0.9084 | 0.188 | 3.19 | 17.0 | 2.14$^A$ |
| 15 | Isobutane | 0 | E | 101 | 0.50 | 0 | 851 | 0.9491 | 0.067 | 4.72 | 70.4 | 5.13$^B$ |
| 16 | HFC-236fa | 10$^c$ | E | 102 | 0.50 | 0 | 184 | 0.9302 | — | — | — | — |
| 17 | Isobutane | 10$^c$ | E | 102 | 0.50 | 0 | 999 | 0.9305 | 0.137 | 7.45 | 54.4 | 4.16$^B$ |
| 18 | HFC-236fa | 20 | E | 100 | 0.50 | 0 | 283 | 0.9194 | 5.43 | 140.7 | 25.9 | 3.97$^B$ |
| 19 | HFC-245fa | 20 | E | 102 | 0.50 | 0 | 154 | 0.9318 | — | — | — | 3.97$^B$ |
| 20 | Isobutane | 20 | E | 101 | 0.50 | 0 | 1644 | 0.9214 | 0.156 | 7.44 | 47.7 | 4.43$^B$ |
| 21 | HFC-236fa | 40 | E | 100 | 0.50 | 0 | 360 | 0.9025 | 8.09 | 226 | 27.9 | 4.27$^B$ |
| 22 | Isobutane | 40 | E | 100 | 0.50 | 0 | 1453 | 0.9131 | 0.184 | 4.45 | 24.2 | 3.80$^B$ |
| 23 | Isobutane | 60 | E | 101 | 0.50 | 63.6 | 4287 | 0.9129 | 0.16 | 4.06 | 25.4 | 4.17$^B$ |

$^A$GPC Method A;
$^B$GPC Method B,
$^c$1-butene instead of 1-hexene

Process Description

Experimental runs were conducted in a lab-scale, 2-liter slurry polymerization reactor using the described diluent in Tables 1 and 11. The catalyst and TEAL used was as shown in Table 11 and as described above. All experiments were carried out at a reaction temperature of 85° C., for 45 minutes. The 1-hexene, 1-butene and diluent were purified prior to reaction by passing the purification systems as described above.

For each experiment, the reactor was purged with nitrogen, followed by the addition of the TEAL solution (0.5 molar in hexane), and 0 to 180 cc of 1-hexene or 1-butene. Then 750 cc of diluent was added. The reactor temperature was raised to 85° C., and ethylene gas was added to raise the system pressure to 350 psig (2413 kPa). Catalyst (90 to 110 mg) was then flushed in with 250 ml of additional diluent to initiate reaction.

The data in Table 11 shows that for the same amount of comonomer input to the process, the fluorinated hydrocarbon diluents show a higher incorporation of comonomer and a lower product density. This is most probably related to the lower ethylene solubility in HFC and thus a higher effective hexene-1 to ethylene ratio. This is shown graphically in FIG. 1.

Figure 2:
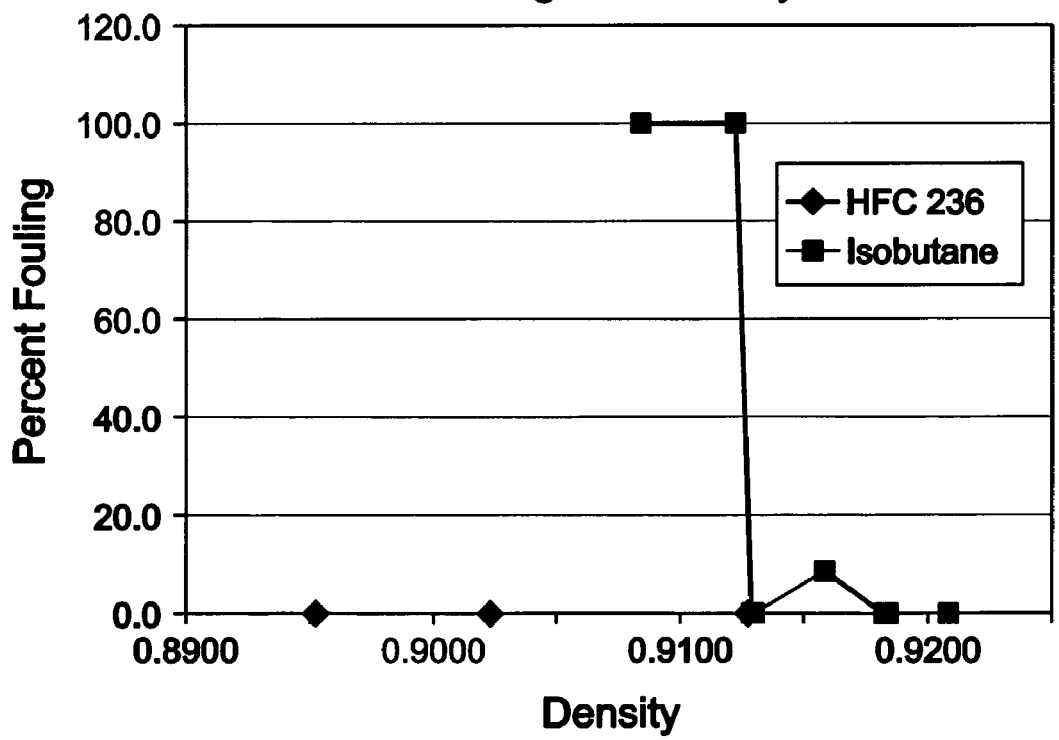
FIG. 2 shows the polymer density versus fouling for HFC vs. hydrocarbon diluent.

The data further show that product can be produced at a lower density using the fluorinated hydrocarbon diluents without fouling. This is shown graphically in FIG. 2.

Having now fully described this invention, it will be appreciated by those skilled in the art that the invention can be performed within a wide range of parameters within what is claimed, without departing from the spirit and scope of the invention.

All documents described herein are incorporated by reference herein, including any priority documents and/or testing procedures, to the extent that they are not inconsistent with the disclosure herein.

We claim:

1. A process for producing polymer comprising polymerizing ethylene and optionally one or more comonomers at a temperature of from 30° C. to 200° C. in the presence of a supported bulky ligand metallocene-type catalyst system and a diluent to form a slurry of polymer solids, wherein the diluent comprises at least 5 volume percent of a fluorinated hydrocarbon based on the total volume of the diluent, wherein the fluorinated hydrocarbon is not a perfluorocarbon, and wherein the bulky ligand metallocene-type catalyst system comprises an activator and a bulky ligand metallocene-type compound is represented by the formula:

where M is a metal from Group 3 to 12 of the Periodic Table of Elements, $L^A$ and $L^B$ are selected from the group consisting of cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, pyrrolyl ligands, pyrozolyl ligands, carbazolyl ligands, borabenzene ligands and hydrogenated versions thereof;

Q is a monoanionic labile ligand having a sigma-bond to M, and depending on the oxidation state of M, the value for n is 0, 1 or 2 such that Formula I or II above represents a neutral bulky ligand metallocene-type catalyst compound; and A is a bridging group containing carbon, germanium or silicon.

2. The process of claim 1 wherein the bulky ligand metallocene-type catalyst system comprises a Group 3-6 metal, biscyclopentadienyl or substituted biscyclopentadienyl compound.

3. The process of claim 1 wherein the fluorinated hydrocarbon consists essentially of at least one carbon atom and at least one fluorine atom, and optionally at least one hydrogen atom.

4. The process of claim 1 wherein the fluorine containing hydrocarbon is represented by the formula: $C_xH_yF_z$ wherein x is an integer from 1 to 40, and y and z are integers of at least one.

5. The process of claim 4 wherein y and z are integers equal to or greater than 1.

6. The process of claim 4 wherein x is an integer in the range of from 1 to 10.

7. The process of claim 2 wherein the molar ratio of the fluorinated hydrocarbon to the Group 3-6 metal is greater than 100:1.

8. The process of claim 1 wherein the diluent further comprises at least one $C_1$ to $C_{40}$ alkane, preferably at least one $C_1$ to $C_{20}$ alkane, or more preferably at least one $C_1$ to $C_8$ alkane.

9. The process of claim 1 wherein the diluent comprises a mixture of at least one saturated hydrocarbon and at least one fluorinated hydrocarbon wherein the mixture has a density in the range of from 0.2 g/cc less than to 0.2 g/cc greater than the density of the polymer.

10. The process of claim 9 wherein the mixture has a density in the range of from 0.1 g/cc less than to 0.1 g/cc greater than the density of the polymer.

11. The process of claim 10 wherein the mixture has a density in the range of from 0.05 g/cc less than to 0.05 g/cc greater than the density of the polymer.

12. The process of claim 1 wherein the diluent comprises a mixture of at least one saturated hydrocarbon and at least one fluorinated hydrocarbon and the fluorinated hydrocarbon comprises greater than 1 weight percent of the mixture.

13. The process of claim 12 wherein the fluorinated hydrocarbon comprises greater than 5 weight percent of the mixture.

14. The process of claim 13 wherein the fluorinated hydrocarbon comprises greater than 10 weight percent of the mixture.

15. The process of claim 1 wherein the diluent comprises a mixture of at least one saturated hydrocarbon and at least one fluorinated hydrocarbon and the fluorinated hydrocarbon comprises greater than 1 volume percent of the mixture.

16. The process of claim 1 wherein the fluorinated hydrocarbon comprises greater the 10 volume percent of the mixture.

17. The process of claim 1 wherein ethylene comprises 50 weight % or more of the total weight of ethylene and comonomer polymerized.

18. The process of claim 1 wherein ethylene comprises 75 weight % or more of the total weight of ethylene and comonomer polymerized.

19. The process of claim 1 wherein the polymer has a melting temperature of greater than or equal to 75° C.

20. The process of claim 1 wherein the polymer has a heat of fusion greater than or equal to 10 J/g.

21. The process of claim 1 wherein the polymer has a heat of fusion greater than or equal to 40 J/g.

22. The process of claim 1 wherein the polymer has a composition distribution breadth index of greater than or equal to 60%.

23. The process of claim 1 wherein the polymer has a Mw/Mn in the range of from 1.5 to 4.0.

24. The process of claim 1 wherein the comonomers are selected from linear, branched, or ring-containing olefins having up to 30 carbon atoms, and combinations thereof.

25. The process of claim 1 wherein the activator is an alkylalumoxane.

26. The process of claim 1 wherein the activator is a non-coordinating anion activator.

27. The process of claim 1 wherein the process is carried out in a loop reactor.

28. The process of claim 1 wherein the process is carried out in a stirred tank reactor.

29. The process of claim 1 further comprising continuously discharging a portion of the slurry from the reactor as polymerization effluent.

30. The process of claim 29 further comprising flashing the polymerization effluent in a first flash to vaporize from about 50% to about 100% of the liquid medium to produce concentrated polymer effluent and vaporized liquid.

31. The process of claim 30 further comprising condensing the vapor obtained in the first flash without compression.

32. The process of claim 31 further comprising operating the reactor at a space time yield greater than 2.6 lbs/hr-gal (0.316 kg/hr-l).

33. The process of claim 30 further comprising discharging from the first flash polymer solids to a second flash through a seal chamber of sufficient dimension such as to maintain a volume of polymer solids/slurry in the seal chamber sufficient to maintain a pressure seal.

34. The process of claim 9 wherein the volume percent solids in the polymerization slurry in the reactor is greater than 50.

35. The process of claim 30 wherein the first flash is operated at from about 140 psia (965 kPa) to about 315 psia (2172 kPa).

36. The process of claim 30 wherein the concentrated polymer effluent and vaporized liquid are continuously separated.

37. The process of claim 30 wherein the concentrated polymer effluent slurry is flashed in a second flash to vaporize liquid.

38. The process of claim 30 wherein the vapor from the first flash is condensed by heat exchange.

39. The process of claim 27, wherein the polymerization slurry is circulated within the loop reactor by multiple pumps and wherein the reactor volume is greater than 20,000 gallons (75.7 kiloliters).

40. The process of claim 30 further comprising heating the polymerization effluent.

41. The process of claim 40 wherein the polymerization effluent is heated to a temperature below the fusion temperature of the polymer.

42. The process of claim 41 wherein the quantity of heat supplied to the polymerization effluent is at least equal to that quantity of heat which equals the heat of vaporization of the liquid medium which is to be flashed in the first flash.

43. The process of claim 29 wherein the polymer solids are separated from the diluent with a centrifuge apparatus.

44. The process of claim 1 wherein the polymerization is carried out at a temperature of from 0° C. to about 200° C.

45. The process of claim 1 wherein the polymerization is carried out at a pressure of from 1 to 100 atmospheres.

46. The process of claim 1, wherein the diluent comprises a mixture of at least one saturated hydrocarbon and at least one fluorinated hydrocarbon wherein the mixture has a density in the range of from 0.1 g/cc less than to 0.1 g/cc greater than the density of the polymer.

47. The process of claim 1, wherein the comonomers are selected from linear or branched $C_3$ to $C_{20}$ alpha olefins.

48. The process of claim 1, wherein the comonomers are selected from linear $C_3$ to $C_{40}$ alpha olefins.

49. The process of claim 1, wherein the comonomers include at least one polyene.

50. The process of claim 1 wherein $L^A$ and $L^B$ are selected from the group consisting of cyclopentadienyl ligands, indenyl ligands and fluorenyl ligands.

51. The process of claim 1 wherein $L^A$ and $L^B$ are indenyl ligands.

52. The process of claim 51 wherein $L^A$ and $L^B$ are substituted with a combination of substituent groups R, said R groups being selected from hydrogen, linear alkyl radicals, branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl-carbamoyl radicals, dialkyl-carbamoyl radicals, acyloxy radicals, acylamino radicals, aroylamino radicals, straight alkylene radicals, branched alkylene radicals, cyclic alkylene radicals, and combinations thereof.

53. The process of claim 51 wherein $L^A$ and $L^B$ are substituted with a combination of substituent groups R, said R groups being selected from hydrogen, halogen, methyl, ethyl, propyl, butyl, pentyl, hexyl, cyclopentyl, cyclohexyl, benzyl, phenyl, and their isomers.

54. The process of claim 1 wherein the fluorinated hydrocarbon comprises 1,1,1,3,3,3-hexafluoropropane, 1,1,1,2-tetrafluoroethane, 1,1,1,3,3-pentafluoropropane, 1,1,1,3,3-pentafluorobutane, octafluorocyclobutane, and 2,3-dihydrodecafluoropentane.

* * * * *